Figure 1A:
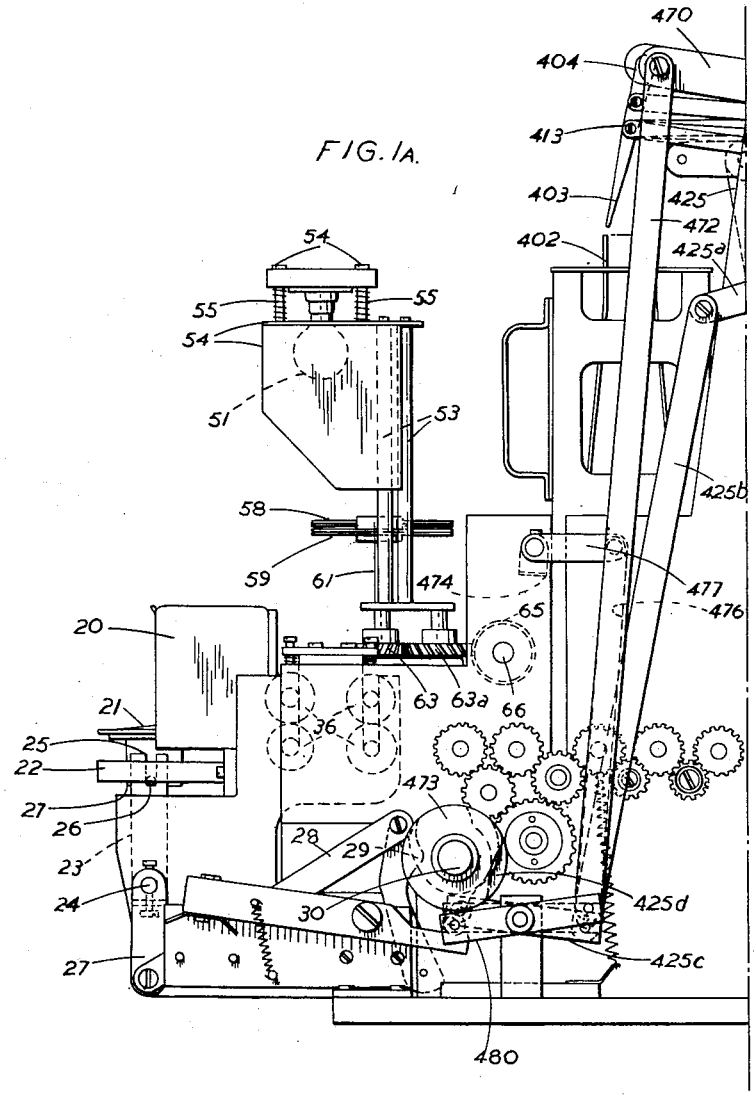

Inventor
RICHARD E. BALDWIN
By J. L. Sterling
Attorney

Inventor
RICHARD E. BALDWIN

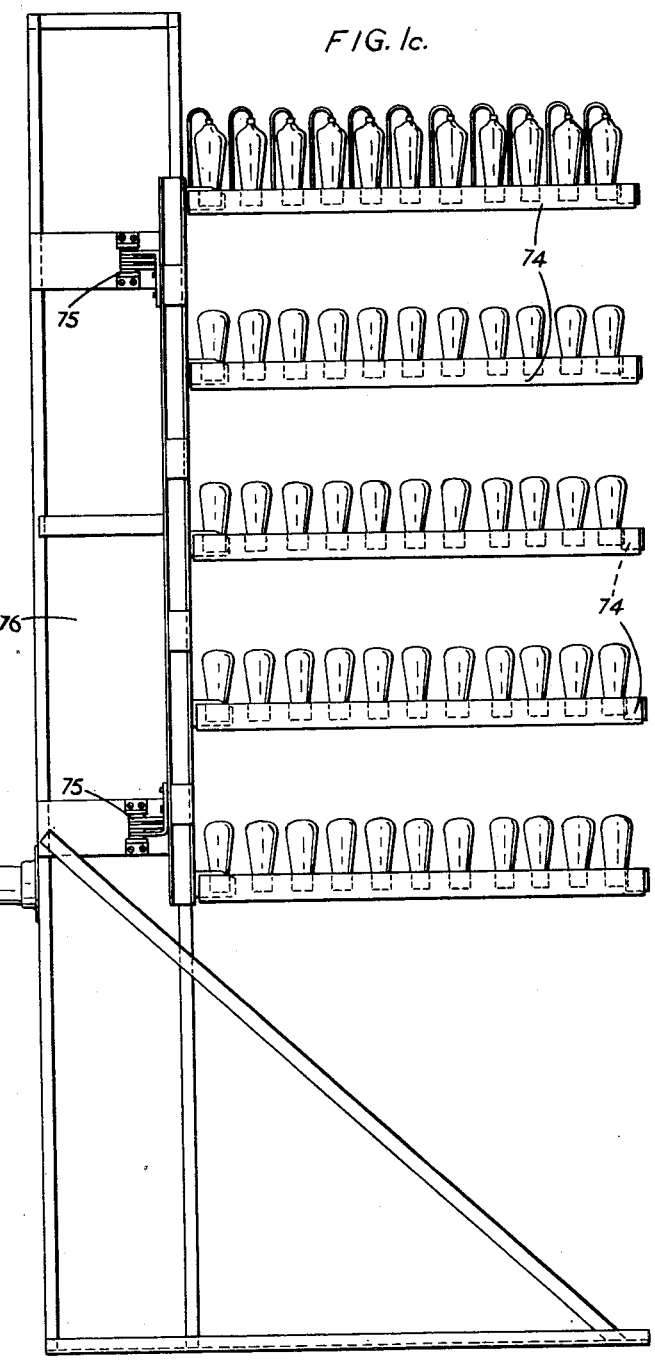

March 6, 1951 R. E. BALDWIN 2,544,126
CALCULATING MACHINE

Filed March 10, 1948 32 Sheets-Sheet 5

*Inventor*
RICHARD E. BALDWIN
By *J. L. Sterling*
*Attorney*

March 6, 1951     R. E. BALDWIN     2,544,126
CALCULATING MACHINE

Filed March 10, 1948     32 Sheets-Sheet 6

*Inventor*
RICHARD E. BALDWIN
By *J. L. Sterling*
*Attorney*

March 6, 1951 R. E. BALDWIN 2,544,126
CALCULATING MACHINE
Filed March 10, 1948 32 Sheets-Sheet 7

Inventor
RICHARD E. BALDWIN
By J. L. Sterling
Attorney

March 6, 1951 R. E. BALDWIN 2,544,126
CALCULATING MACHINE

Filed March 10, 1948 32 Sheets-Sheet 8

Inventor
RICHARD E. BALDWIN
By *JhL Sterling*
Attorney

March 6, 1951 R. E. BALDWIN 2,544,126
CALCULATING MACHINE

Filed March 10, 1948 32 Sheets-Sheet 9

Inventor
RICHARD E. BALDWIN
By J L L Sterling
Attorney

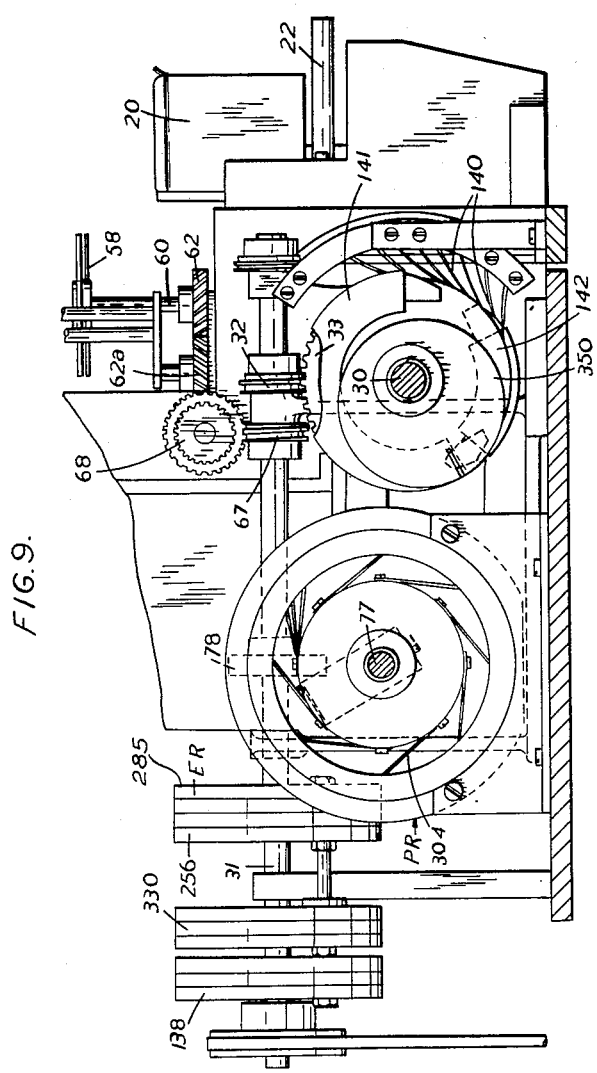

March 6, 1951 R. E. BALDWIN 2,544,126
CALCULATING MACHINE
Filed March 10, 1948 32 Sheets-Sheet 12
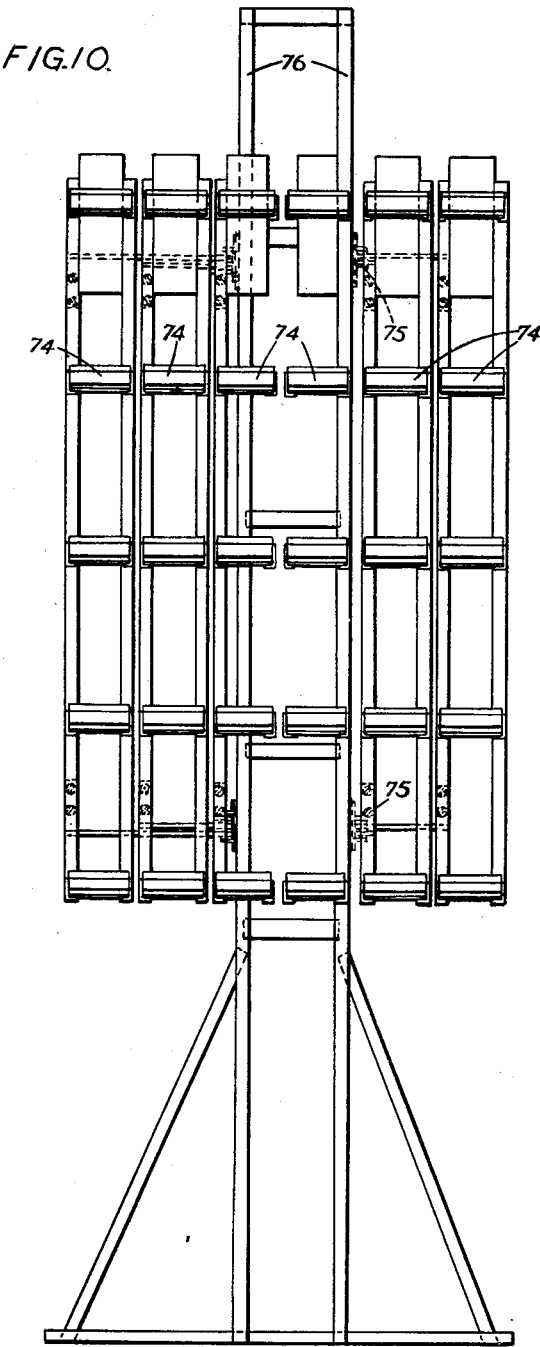
Inventor
RICHARD E. BALDWIN
By *J. L. Sterling*
Attorney

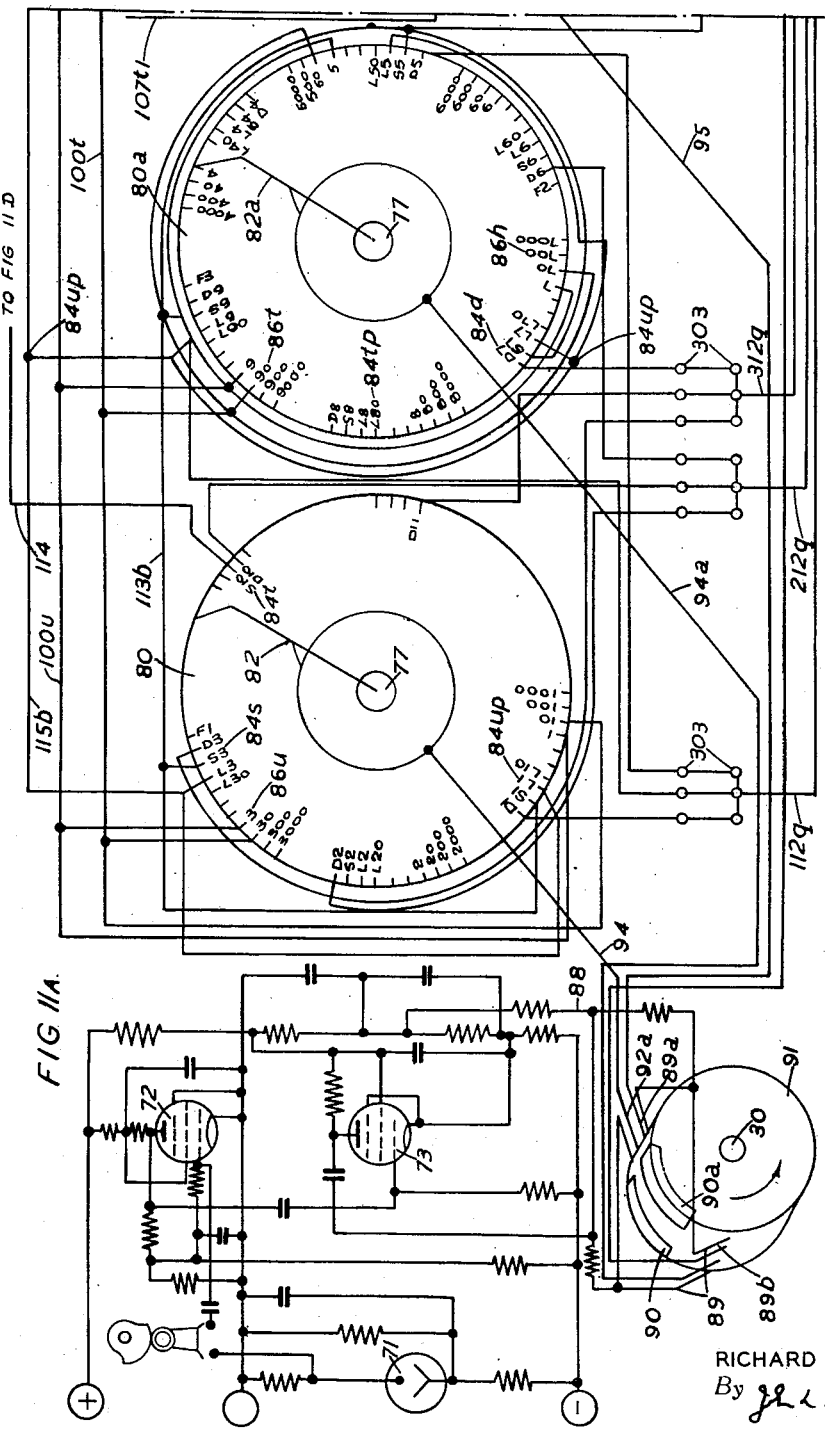

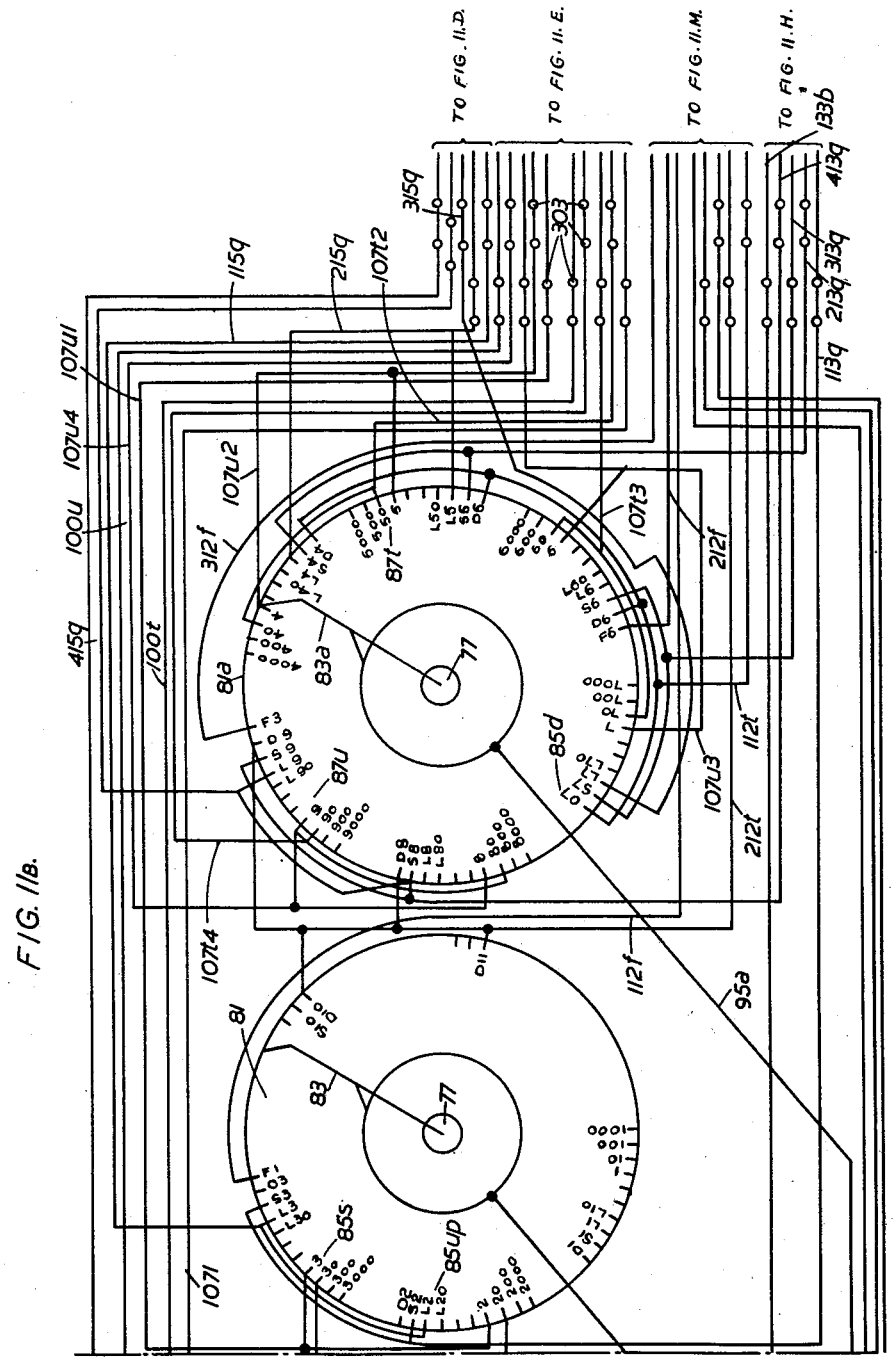

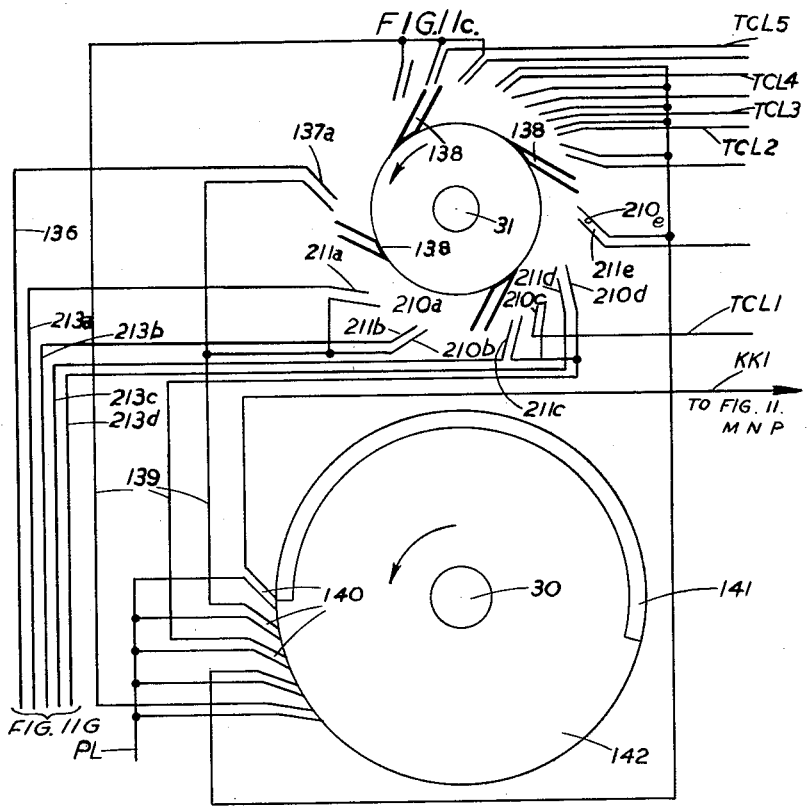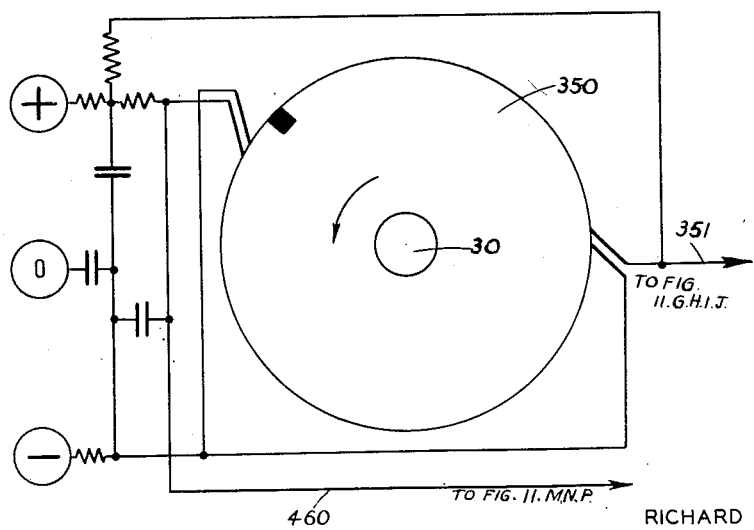

March 6, 1951 R. E. BALDWIN 2,544,126
CALCULATING MACHINE
Filed March 10, 1948 32 Sheets-Sheet 16
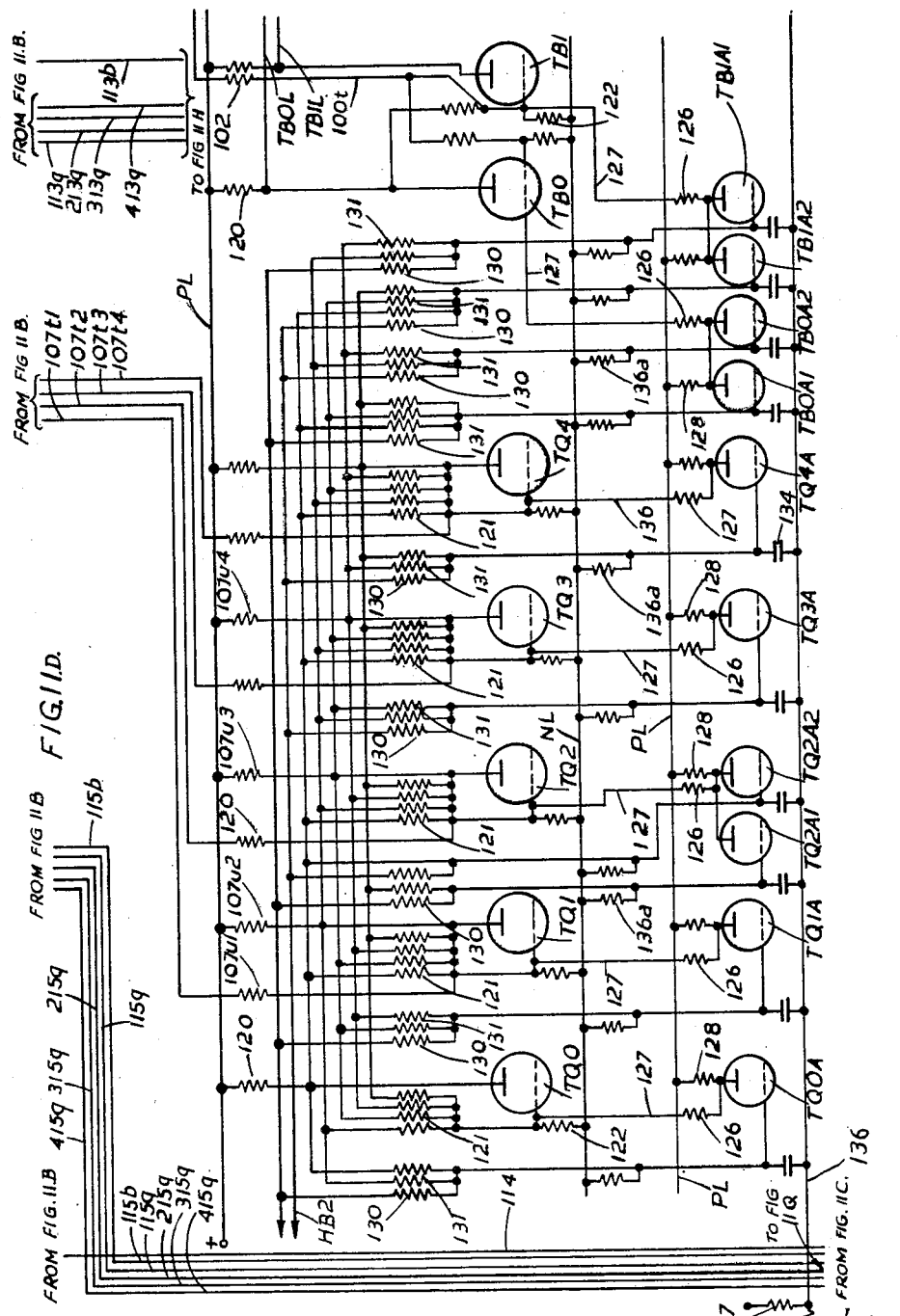
Inventor
RICHARD E. BALDWIN
By J. L. Sterling
Attorney

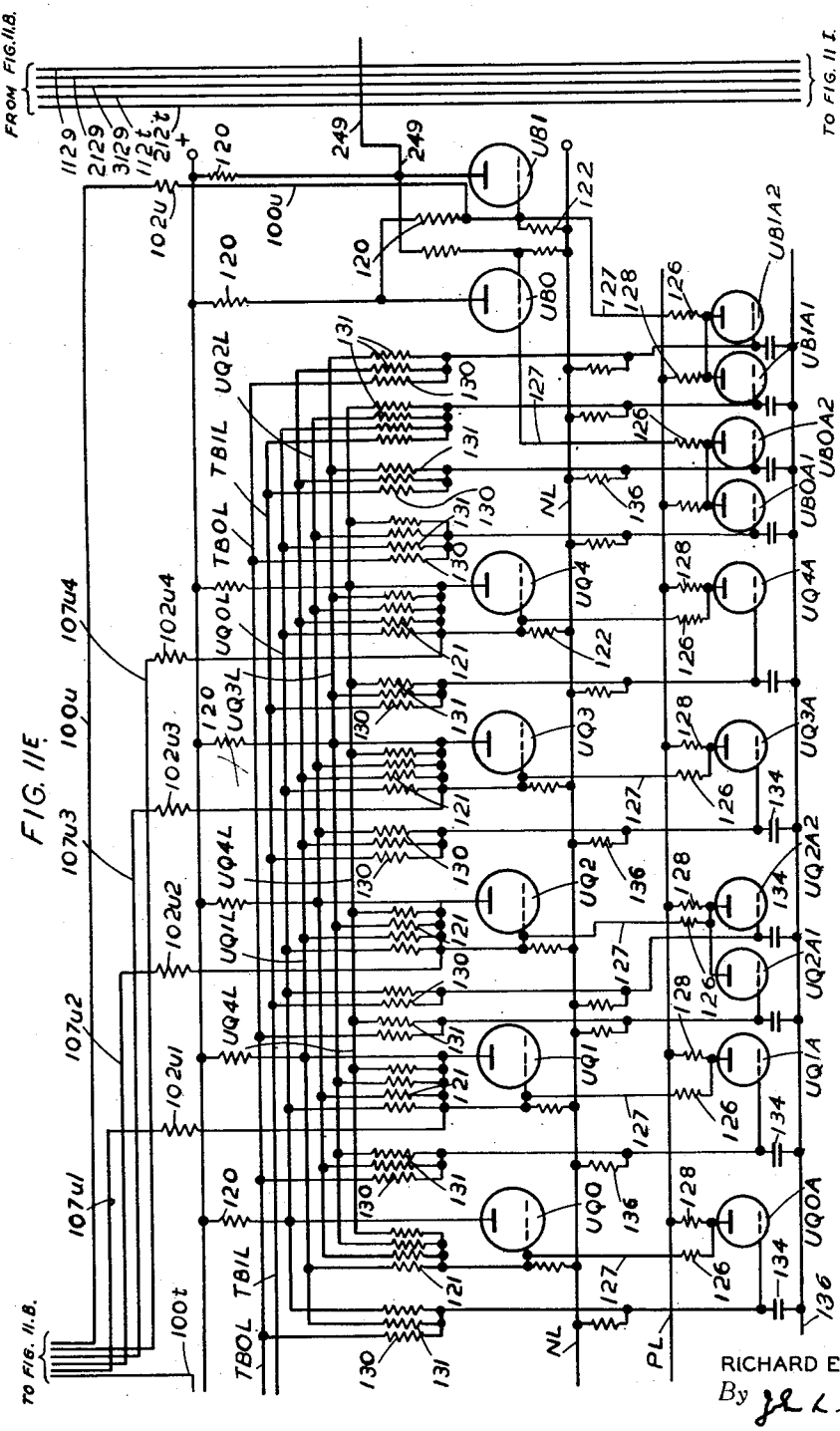

March 6, 1951 R. E. BALDWIN 2,544,126
CALCULATING MACHINE
Filed March 10, 1948 32 Sheets-Sheet 18
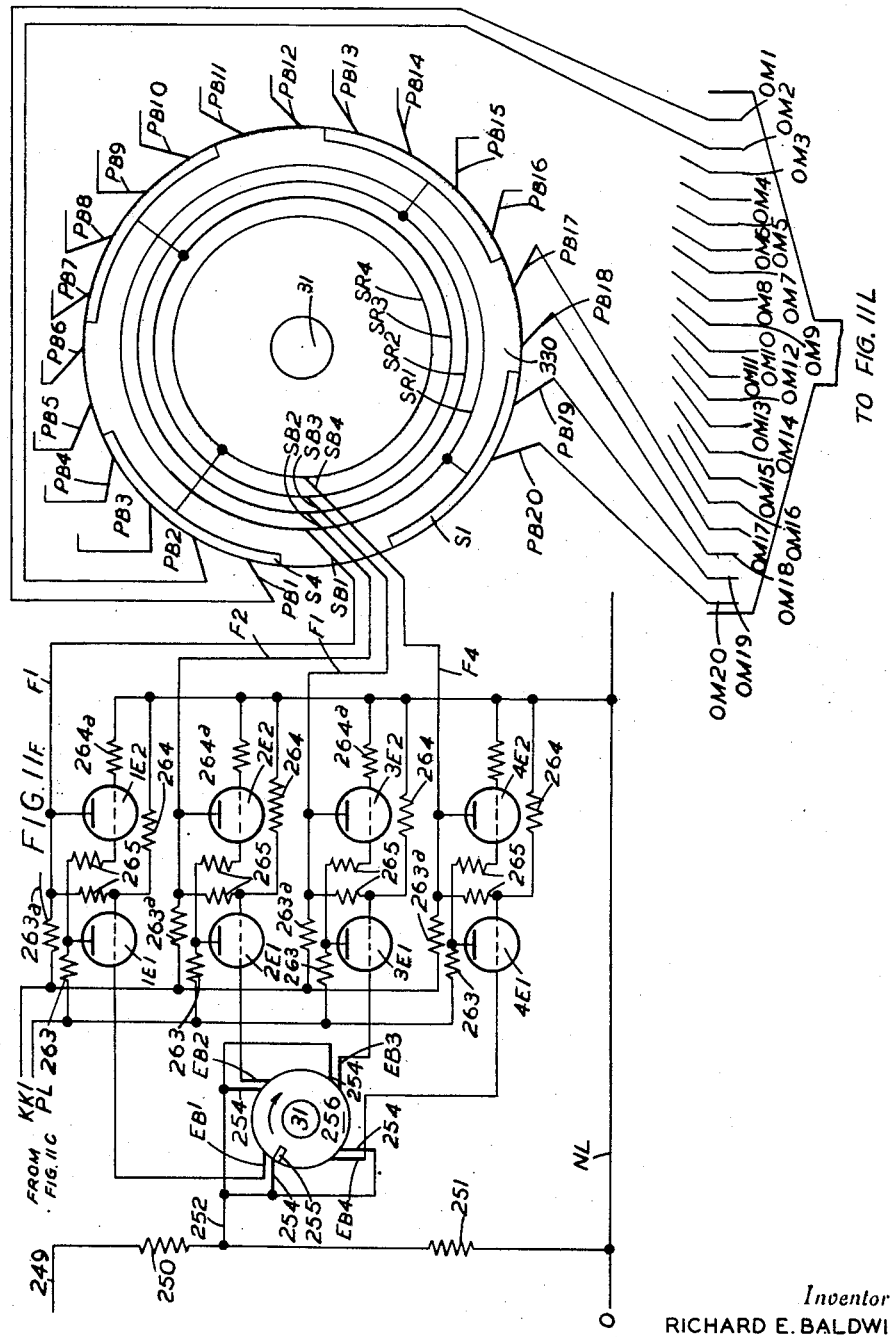
Inventor
RICHARD E. BALDWIN
By *JL L Sterling*
Attorney

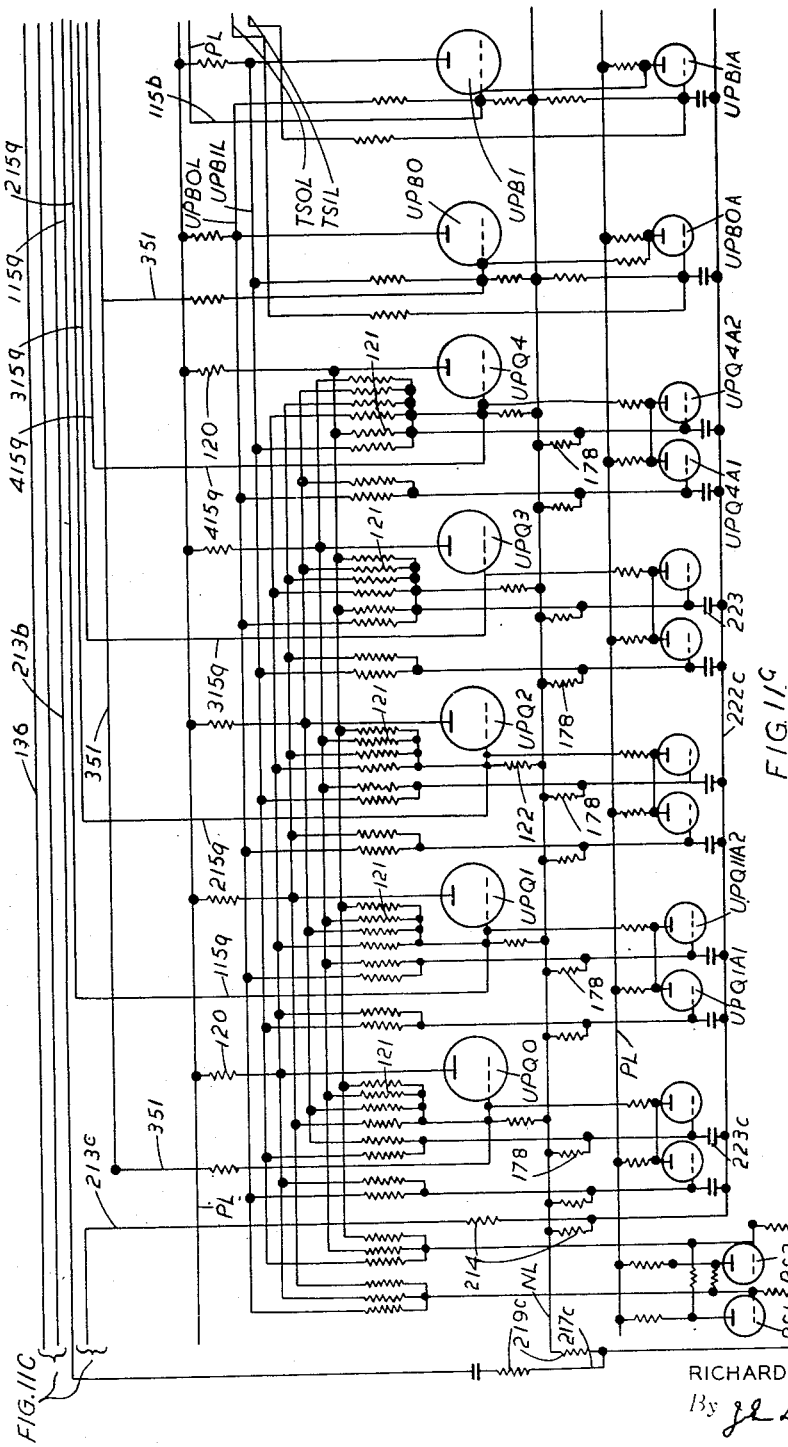

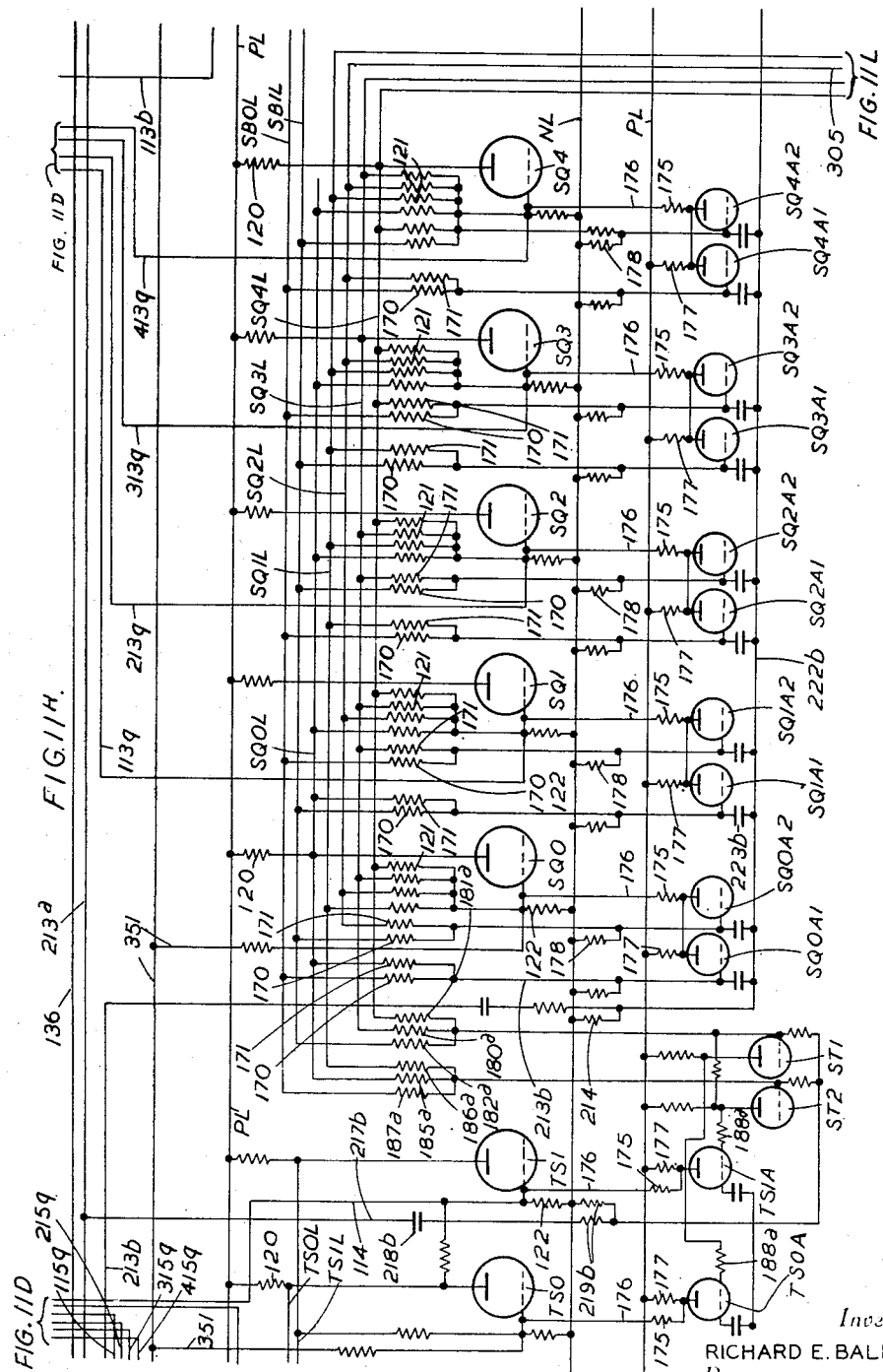

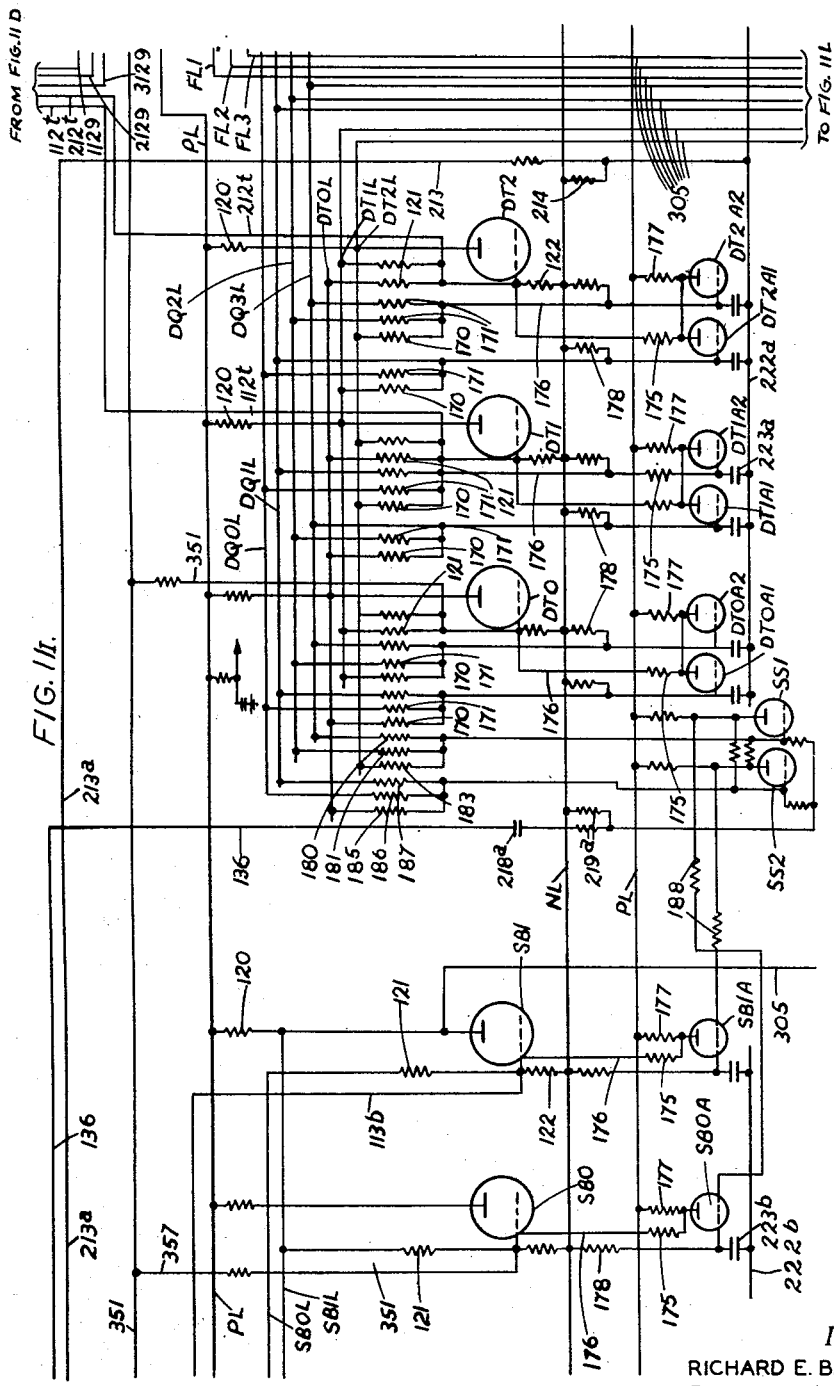

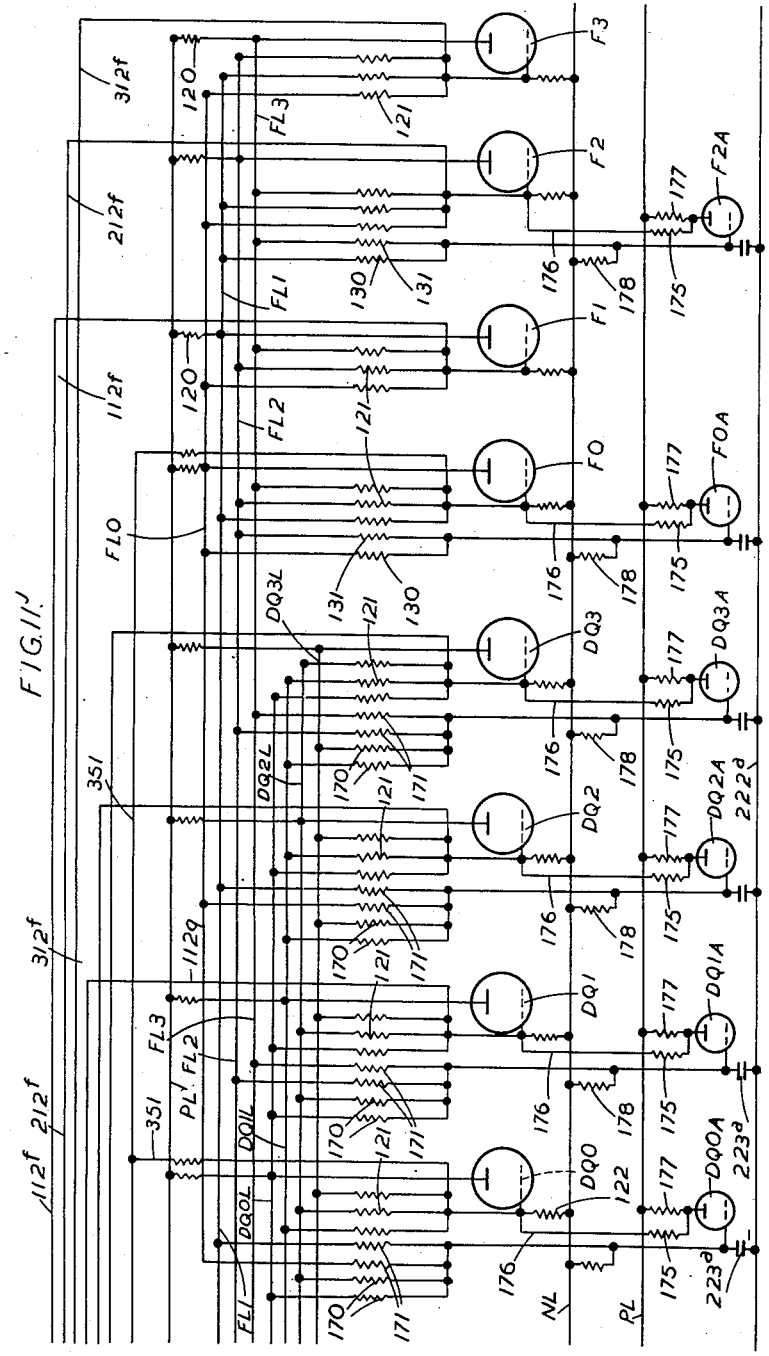

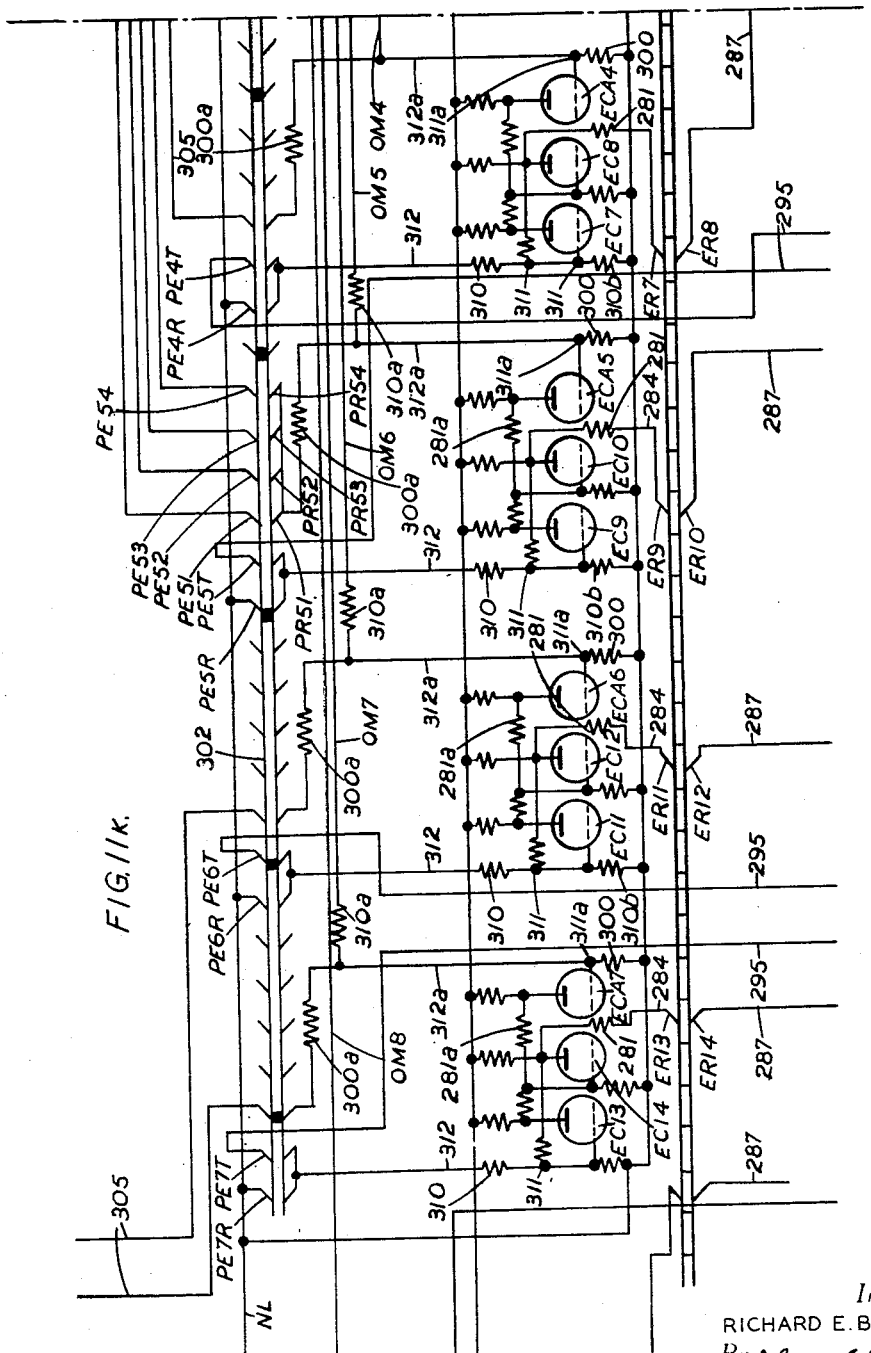

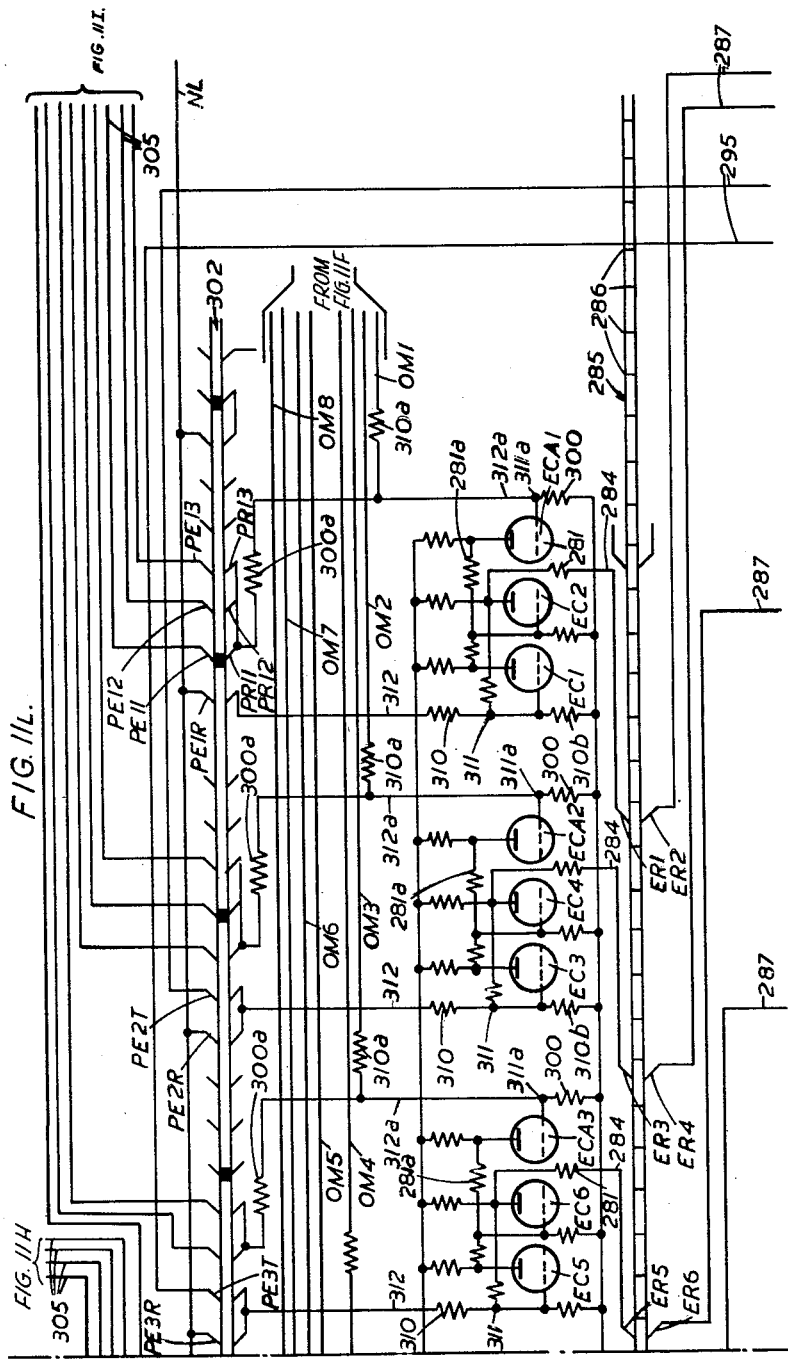

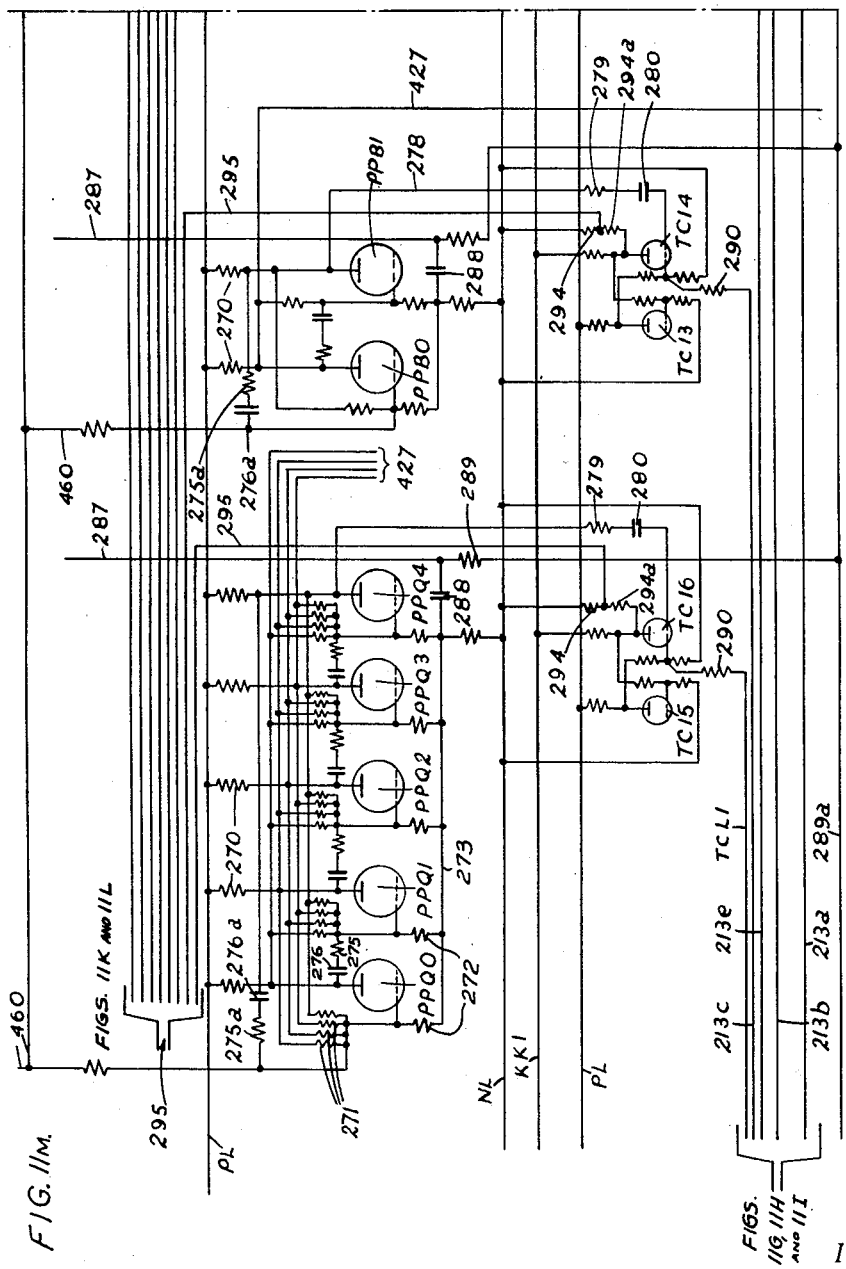

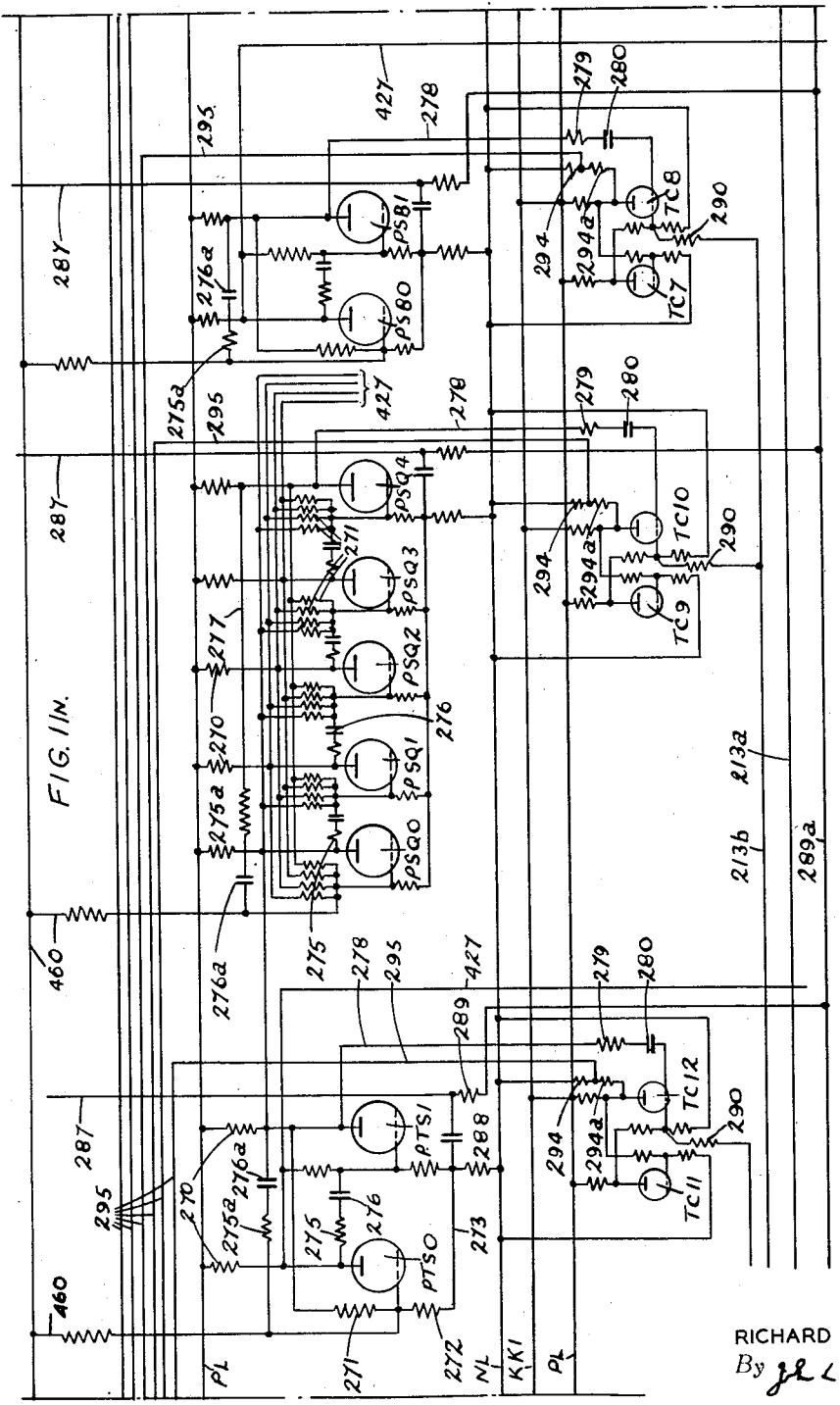

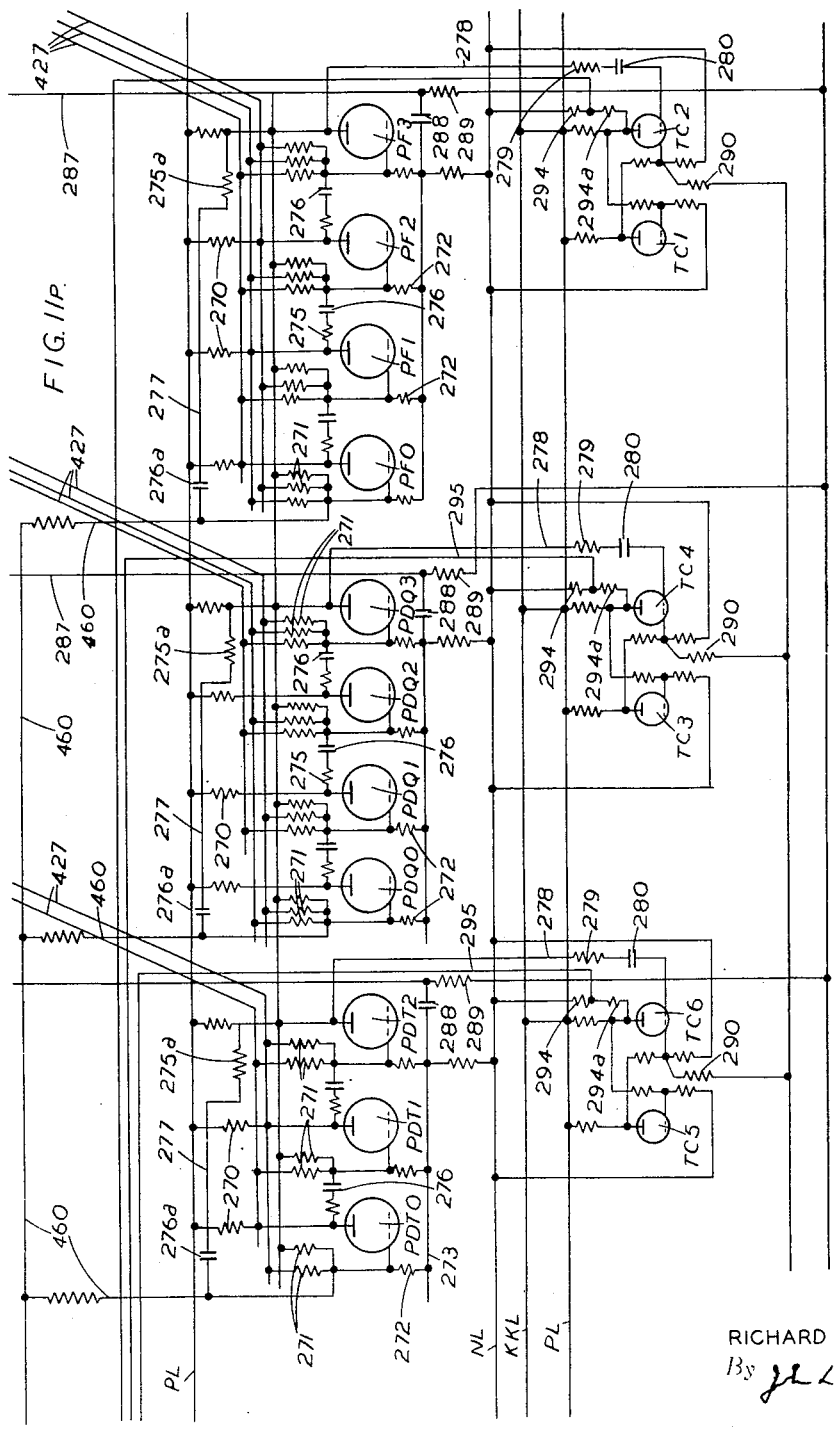

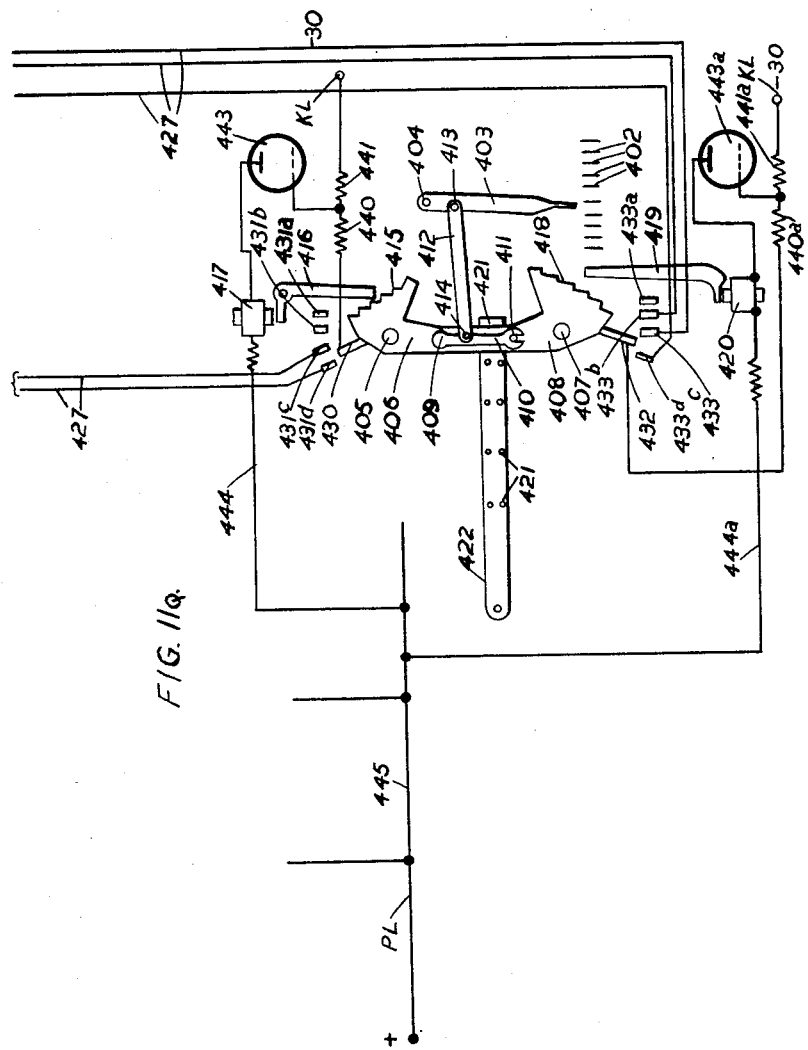

March 6, 1951 R. E. BALDWIN 2,544,126
CALCULATING MACHINE
Filed March 10, 1948 32 Sheets-Sheet 29

FIG. 12.

| FIG. 11B. DISTRIBUTION | FIG. 11F. ODD/EVEN CONTROL OF PRODUCT ENTRY | | |
|---|---|---|---|
| | MULTIPLIER REGISTER | FIG. 11J. FARTHINGS & PENCE QUATERNARY | |
| FIG. 11A. FACTOR SENSING & DISTRIBUTION | FIG. 11E. UNITS | | FIG. 11P. FARTHINGS & PENCE |
| | MULTIPLICAND REGISTER | FIG. 11I. PENCE TERNARY & UNITS OF SHILLINGS BINARY | PUNCH UNIT FIG. 11Q. (PENCE) |
| | FIG. 11H. UNITS OF SHILLINGS, QUINARY & TENS OF SHILLINGS | PRODUCT ENTRY CONTROL VALVE PAIRS | |
| FIG. 11D. TENS | FIG. 11K. SHILLINGS, TEN SHSS. & UNITS OF POUNDS (BINARY) | FIG. 11L. FARTHINGS & PENCE | |
| | PRODUCT REGISTER | | |
| FIG. 11G. UNITS OF POUNDS | FIG. 11M. UNITS OF POUNDS | FIG. 11N. UNITS OF SHILLINGS & TENS OF SHILLINGS | |
| FIG. 11C. DOUBLING & HALVING & ZEROISING PULSE DISTRIBUTION | | | |

*Inventor*
RICHARD E. BALDWIN
By *J. L. Sterling*
*Attorney*

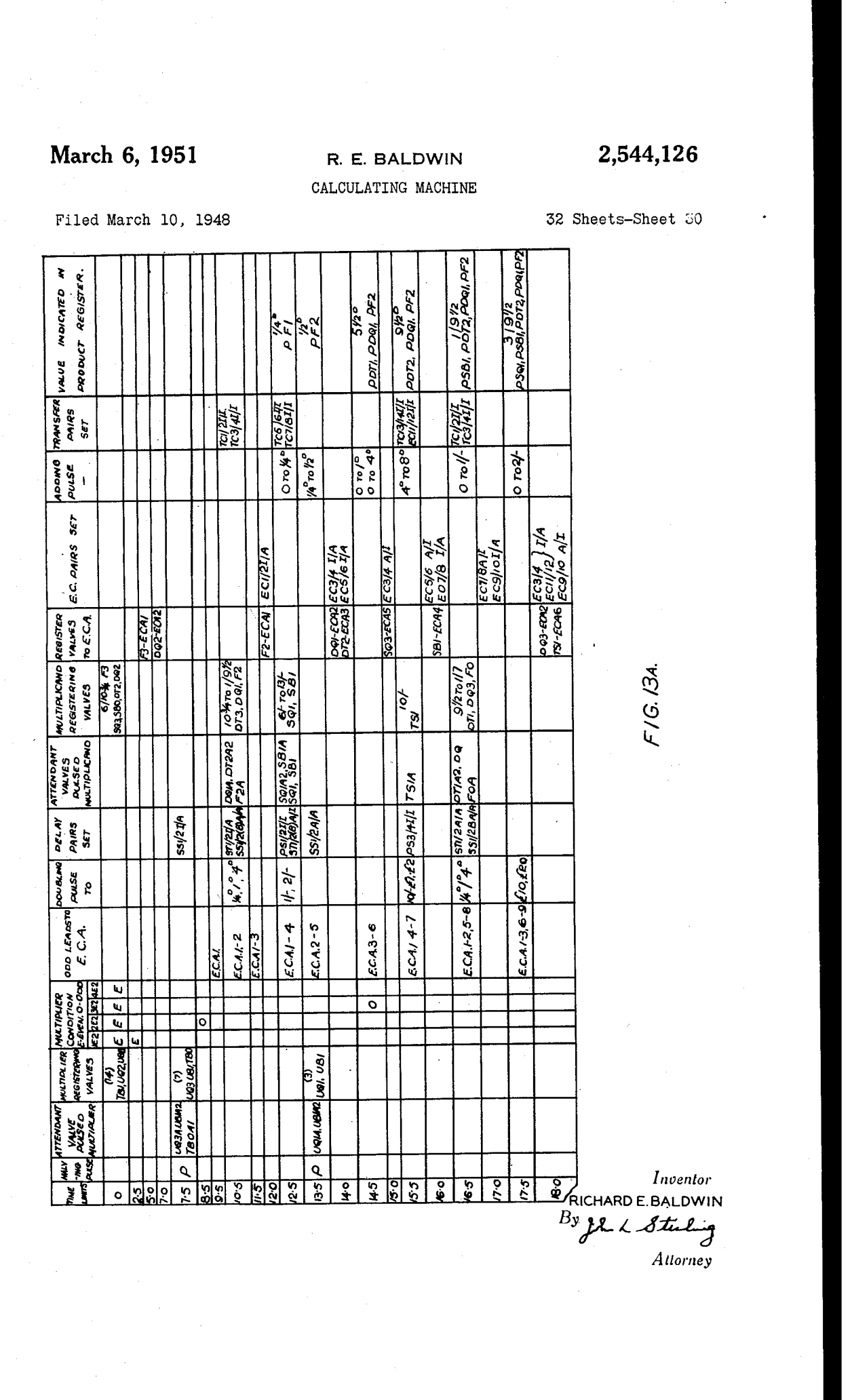

March 6, 1951 — R. E. BALDWIN — 2,544,126
CALCULATING MACHINE
Filed March 10, 1948 — 32 Sheets-Sheet 30

FIG. 13A.

Inventor
RICHARD E. BALDWIN
By J. L. Sterling
Attorney

FIG.13B.

FIG. 13c.

Patented Mar. 6, 1951

2,544,126

UNITED STATES PATENT OFFICE 2,544,126

CALCULATING MACHINE

Richard Everest Baldwin, Coulsdon, England, assignor to Powers-Samas Accounting Machines Limited, London, England, a British company Application March 10, 1948, Serial No. 14,037
In Great Britain March 25, 1947

7 Claims. (Cl. 235—61)

This invention relates to multiplying machines and has for its main object to provide a machine in which multiplication can be carried out at speeds greatly in excess of those obtainable from the usual mechanically or electrically operated machines already in common use.

Another object of the invention is to provide a machine operating at the aforesaid relatively high speeds which will perform direct multiplication of an amount expressed in a non-uniform notation, such as sterling, including decimal or other fractional amounts in the multiplicand, by a decimal number, without decimalisation of the multiplicand.

A further object of the invention is to provide a novel form of statistical record sensing apparatus which will operate at a speed such as to enable machines according to the invention to be controlled thereby.

Yet another object of the invention is to provide a novel form of statistical record perforating mechanism which will enable the results obtained from a machine according to the invention to be perforated in a statistical record.

A multiplying machine constructed in accordance with the invention operates by the method according to which the product is obtained by successively halving the multiplier and doubling the multiplicand, and summing all the multiplicands corresponding to odd multipliers, and according to the invention a multiplying machine operating by the aforesaid method comprises in combination a multiplier and a multiplicand register each including a group of electronic tubes for each denomination, one tube to each digit in the denomination, the grid of each tube within each group being so coupled to the anodes of all the other tubes in the same group that when any one tube is in a predetermined electrical state (for example, non-conducting) hereinafter referred to as the active state, all the other tubes in the group are in the opposite electrical state, hereinafter referred to as the inactive state, factor-entering apparatus, including means for applying to the grid of each tube corresponding to a digit to be entered an electrical pulse of a sign and magnitude such as to cause said tube to register the entered digit by assuming or maintaining the active state, means operative after completion of the factor entering operation and tending to apply successive pulses to the grids of all the tubes in each register, and selection means for each register, effective under the control of the tubes in said register, to permit the application of said pulses only to those tubes which, in the multiplier register, represent the digits of half the value already in said register, and, in the multiplicand register, represent the digits of double the value already in said multiplicand register, the machine further including means for reading off from the multiplicand register the value registered therein and entering said value into a product register, and means operative under control of the lowest value tube in the multiplier register to render said reading off means effective when said lowest value tube is in the active state.

According to a feature of the invention abovementioned selection means includes one or more auxiliary tubes, hereinafter referred to as attendant tubes, to each of the registering tubes to which pulses are to be applied in the halving and doubling operations, the anodes of the particular registering tube or tubes which through the selection means are to control the application of the pulses to any particular registering tube, being coupled to the grid of an attendant tube for said particular registering tube, said attendant tube grid being coupled to a pulse input line and having its anode coupled to the grid of said particular registering tube whereby the potentials normally applied to the grids of the different tubes may be so selected that each attendant tube is normally in the opposite electrical state from that assumed by the registering tube when inactive and a reversal of the electrical state of an attendant tube causes the registering tube to the anode of which the grid of said attendant tube is coupled to assume or maintain the active state, while the change in grid potential of an attendant tube due to the application of the pulse from the input line is insufficient to reverse the electrical state of said attendant tube unless the appropriate register tubes whose anodes are coupled to the grid of said attendant tube are all in active state.

Thus if the active condition of the registering tubes is non-conducting, all tubes which are not registering a digit will be conducting and the attendant tubes will be normally non-conducting. Alternatively if the active condition of the registering tubes is conducting, all the tubes which are not registering a digit will be non-conducting, also the attendant tubes may be normally conducting.

Preferably the product register includes a group of electronic tubes for each denomination, one tube to each digit in the denomination, the grid of each tube within each group being so coupled to the anodes of all the other tubes in the same group that when any one tube is in the active state all the other tubes in the same group are in the inactive state, and the anode of each tube within each group being so coupled to the grid of the next higher digital value tube in the same group, that the application of an adding pulse of a predetermined sign and magnitude to the negative lead of all tubes in the group renders the active tube inactive and the next higher value tube active, the machine including also means, operative under the control of the multiplicand register reading-off means, for applying simultaneously to the grids of all the product register tubes in each denominational group respectively, a number of adding pulses equal in number to the digit registered in the corresponding denominational group of the multiplicand register, while the anode of the highest value tube in each denomination of the product register is coupled to the grid of the lowest value tube in the same denomination and also to a device arranged to be rendered effective, when said highest value tube changes to the inactive state, to apply an adding pulse to the grid of the product register tubes in the next higher denomination to effect a transfer of one unit.

The entry into the product register of an amount read off from the multiplicand register is only to be effected when the contemporaneous multiplier is odd and accordingly the device for applying the adding pulses is under the joint control of the multiplicand register tubes and the lowest value tube is the multiplier register in such a way as to be effective only when said lowest value multiplier tube is in the active state.

Preferably the product entry control means includes a trigger pair of tubes, hereinafter referred to as the odd/even control pair, having the grid of the first tube of the pair coupled to the anode of the lowest value multiplier register tube, a trigger pair of product entry control tubes for each denomination, a plurality of product entry control brushes to each multiplicand denomination each spaced from a datum position by a distance representing its digital value, and each coupled to the anode of the corresponding value multiplicand register tube, a first connecting means to connect the brushes of each denominational group, in order of decreasing value, to the grid of the corresponding entry control pair, a second connecting means for connecting the anode of the second tube of the odd/even trigger pair to the grid of the first tube of each entry control pair, said second connecting means being operative during the connection of said brushes to the grid of said entry control pair, and a third intermittent connecting means operative synchronously with the other two to connect the anode of the second tube of the entry control pair to the grids of the corresponding denominational group of product register tubes.

With this arrangement the potentials normally applied to the grids of the tubes employed may be so selected that the second tube of the product entry control pair is normally inactive and the second tube of the odd/even trigger pair is normally inactive, but becomes active when the multiplier becomes odd, the second tube of the product entry control pair only becoming active when the grid of the first tube of said pair is connected by the connecting means, both to the anode of a multiplicand register tube which is itself active and also to the anode of the second tube of the odd/even pair, when active, said second tube of the product entry control pair remaining active until the grid of the second tube of said pair is connected to a positive potential.

Preferably, an auxiliary valve is associated with each entry control pair, the anode of said auxiliary valve being connected to the grid of its associated even numbered entry control valve, said auxiliary valve when conducting being operative to cause its associated entry control pair to assume the active condition.

In order to effect a transfer from one product register denomination to the next, the anode of the highest value tube in each product register denomination is connected to the grid of the first tube of a transfer control trigger pair of tubes in which the anode of said first tube is connected to a transfer brush in the next higher denominational group of product entry control brushes, said transfer brush being disposed to be connected to the grid of the first product entry control tube after said tube has been disconnected from the anode of the second tube of the odd/even pair, whereby the grid potentials may be selected so that when the highest value tube in a product denomination changes from active to inactive an adding pulse is passed to the grids of the tubes in the next higher product register denomination through the transfer brush and the product entry control tubes.

Preferably in order to increase the speed of operation of the machine the multiplicand is doubled in sections, so that in general each denomination is doubled later than the denomination below so that at any instant the lowest denomination may have been doubled several times more than the highest.

Since the amount in a higher denominational section is doubled later in time than the amount in the next lower denominational section it is necessary to delay any transfer from the lower to the higher section arising out of the doubling of the amount in the lower section until the doubling operation in the higher section takes place.

To this end a trigger pair of transfer storage tubes is provided between each section and the next, one of said tubes having its grid coupled to the anodes of the tubes in the lower denominational section representing digits which, when doubled cause a transfer, while the other transfer storage tube has its grid coupled to the anodes of the tubes in the lower denominational section representing digits which, when doubled do not cause a transfer, the anode of the former tube being coupled to the grid of an attendant tube for the No. "0" tube in the next higher denominational section while the anode of the latter tube is coupled to the grid of an attendant tube for the No. "1" tube in the next higher denominational section, each attendant tube having its anode coupled to the grid of the associated register tube, while the negative lead of the transfer storage tubes is coupled to a device for applying a pulse thereto simultaneously with the application of the doubling pulse to another denominational section of the multiplicand register.

According to a further feature of the invention means are provided for controlling the machine by statistical records such as perforated cards, and to enable the sensing operation to be effected at a sufficiently high speed the records may be sensed, while in motion in a direction at right angles to its horizontal data receiving rows or lines by a beam of radiant energy which is traversed across one section of the record while simultaneously moving in the direction of travel of the record by a distance equal to the pitch of the lines on the record.

Thus the invention includes apparatus for sensing a statistical record while in motion, including means for moving a beam of radiant energy, transversely of the direction of motion of the record and in a linear path parallel to a straight line joining the centre line of one column at one edge of the section of the record and the centre line of the next column at the other edge of the section of the record considering the direction of motion of the latter, said beam being moved across the record in this way a number of times per second equal to the number of record lines passing a stationary point in each second.

Preferably the records are perforated and the beam, in passing through a perforation influences a photocell which sends a pulse to a commutator device operative, in timed relation with the passage of the sensing beam along a record column, to couple the grids of the multiplier and multiplicand register tubes in turn to the photocell at times in the cycle at which the corresponding index point position on the record is illuminated by the beam.

A machine according to the invention may also include punch selector mechanism, operative under control of means for reading the product out of the product register and serving to select, for operation, punches representing the product, whereby said product may be recorded by punching it in a record.

Figure 1B:
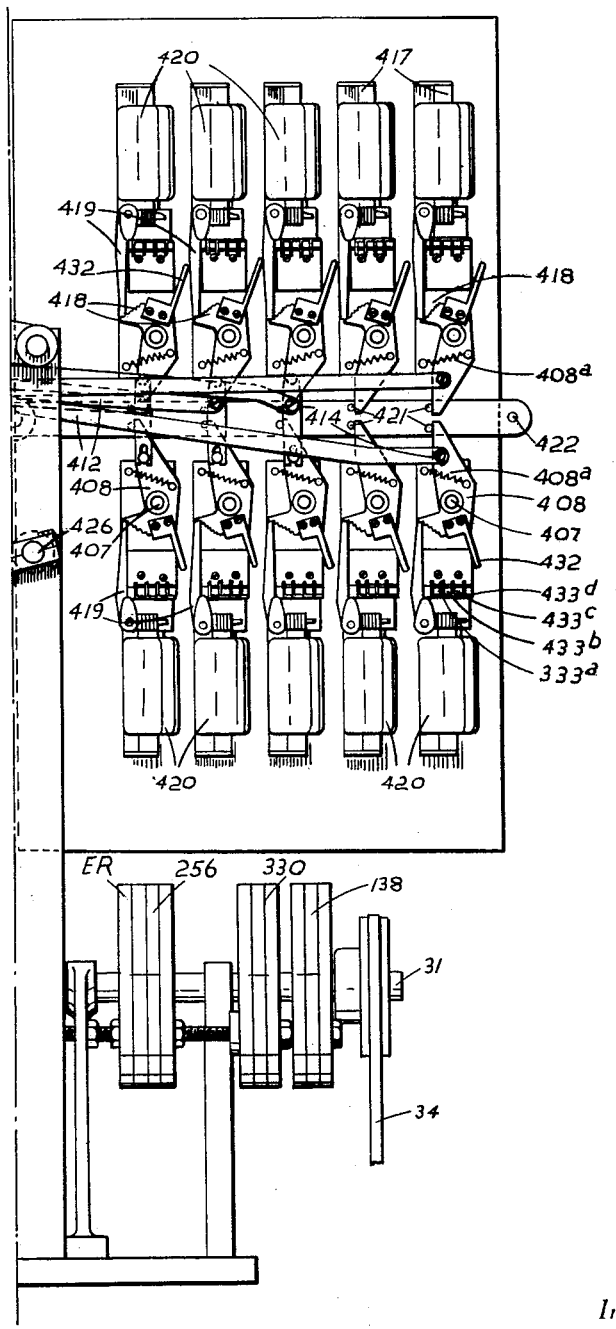

In order that the invention may be more completely understood, one embodiment thereof will now be described by way of example with reference to the accompanying diagrammatic drawings in which:

Figures 1A, 1B, 1C are a diagrammatic side elevation of the upper portion of the machine.

Figure 2:
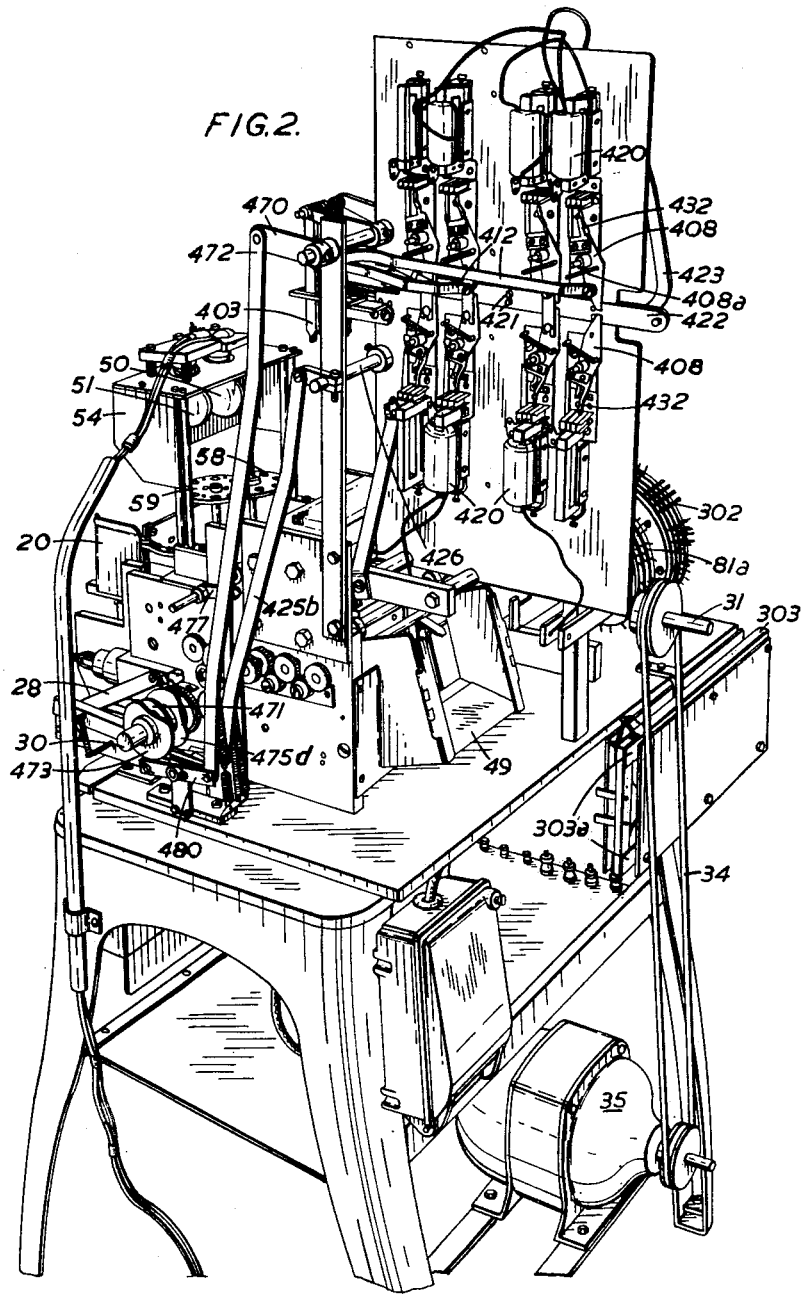
Figure 3:
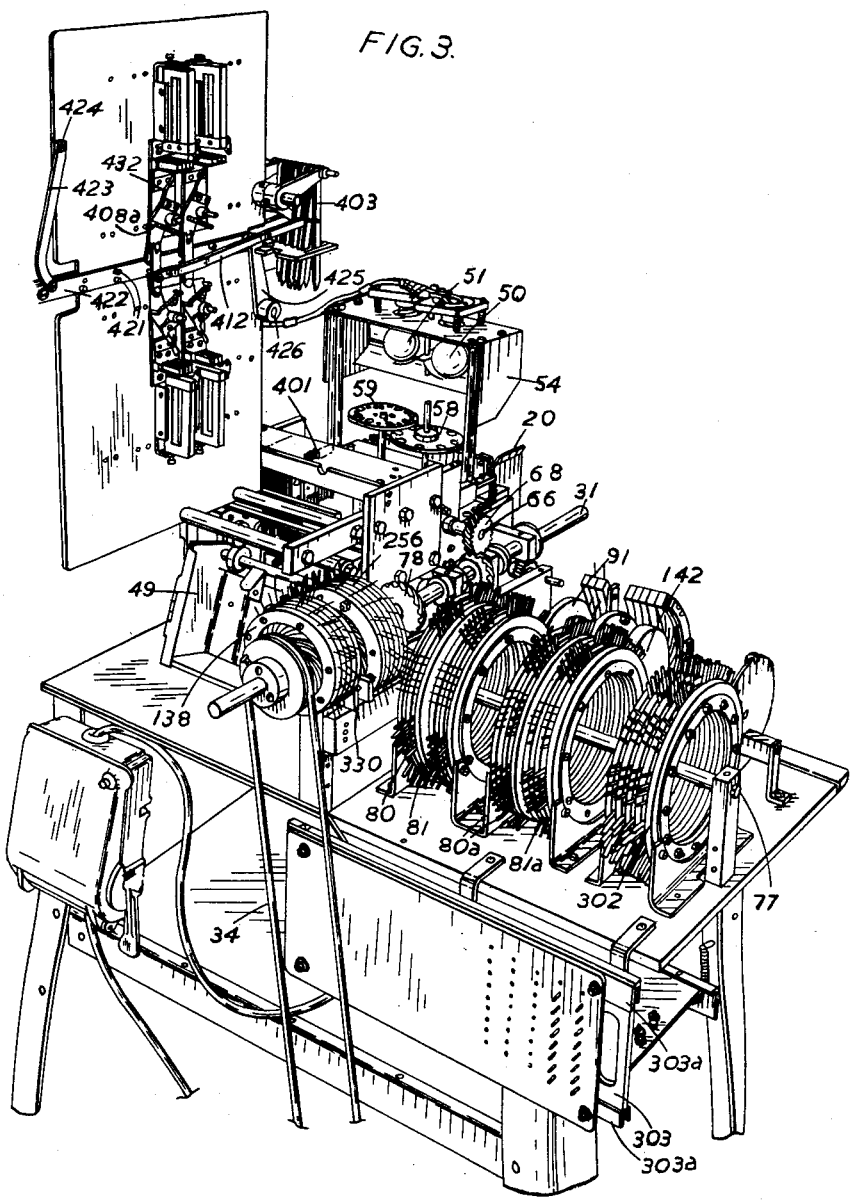
Figure 4:
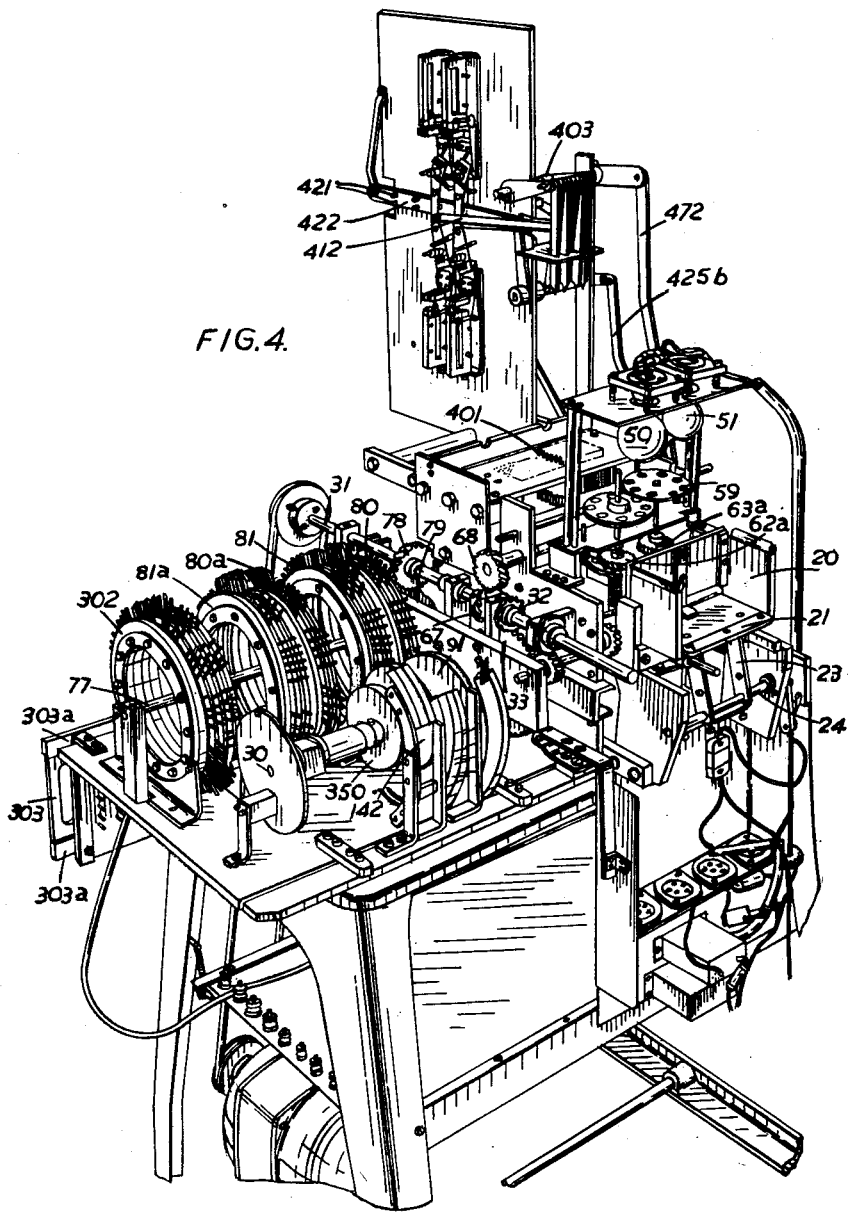
Figure 5:
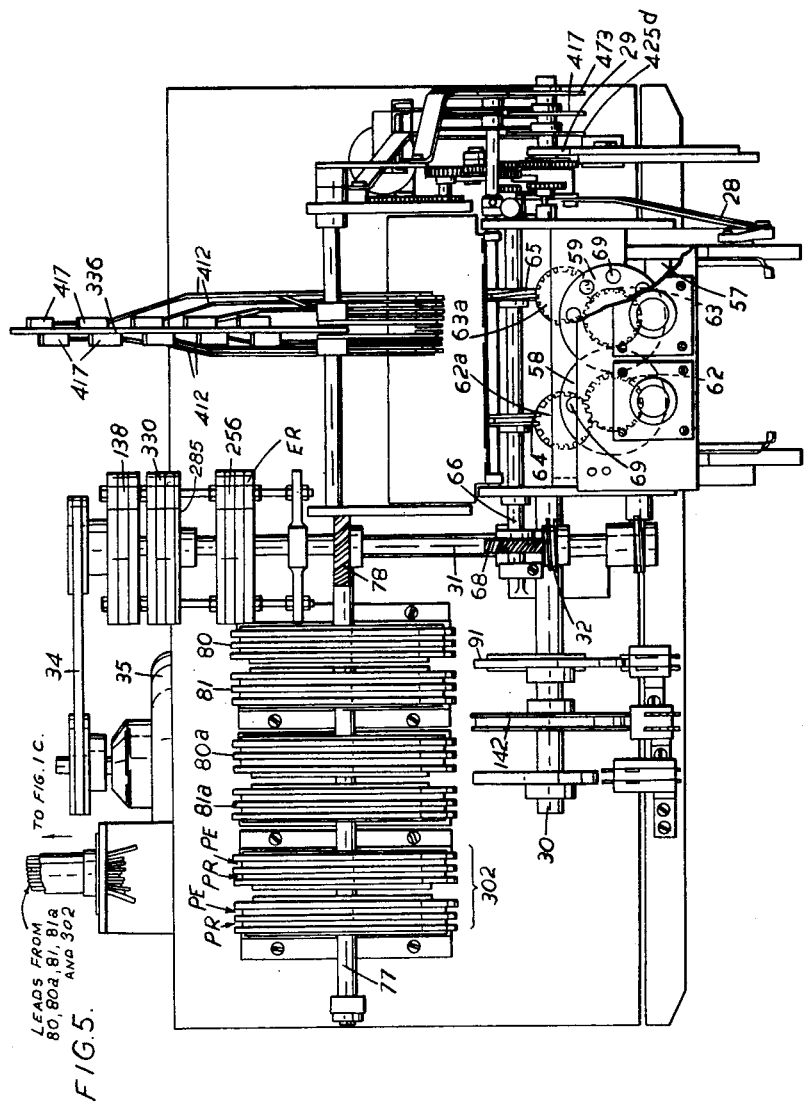
Figure 6:
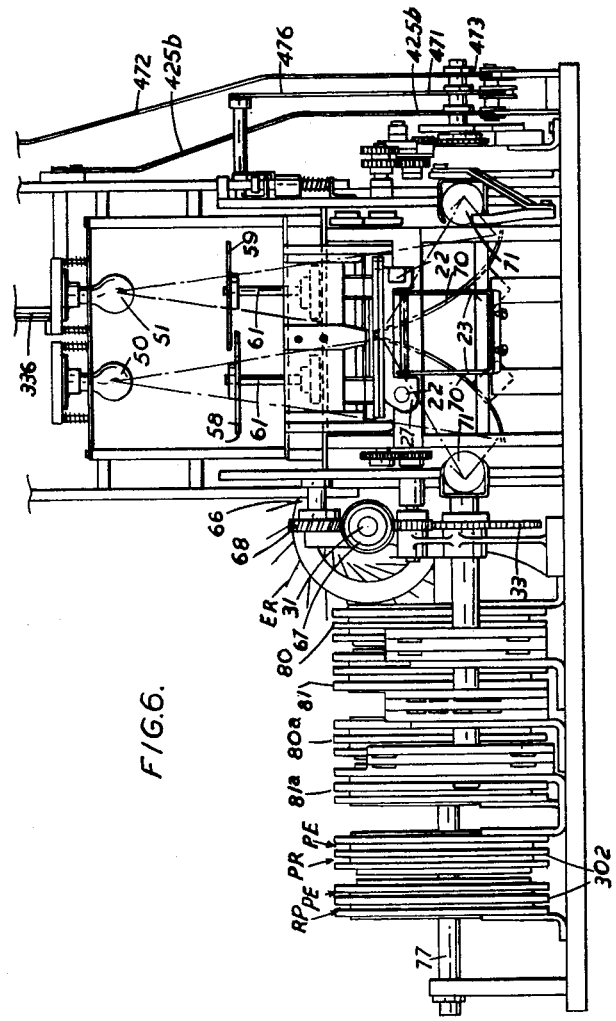
Figure 7:
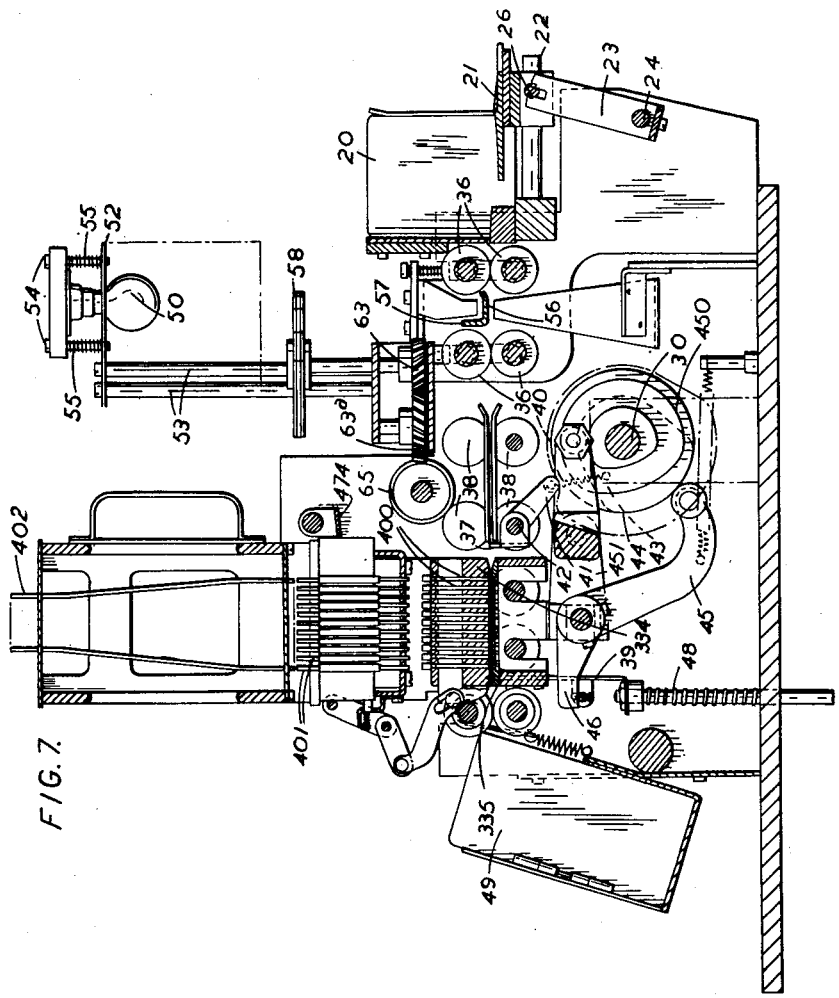
Figure 8:
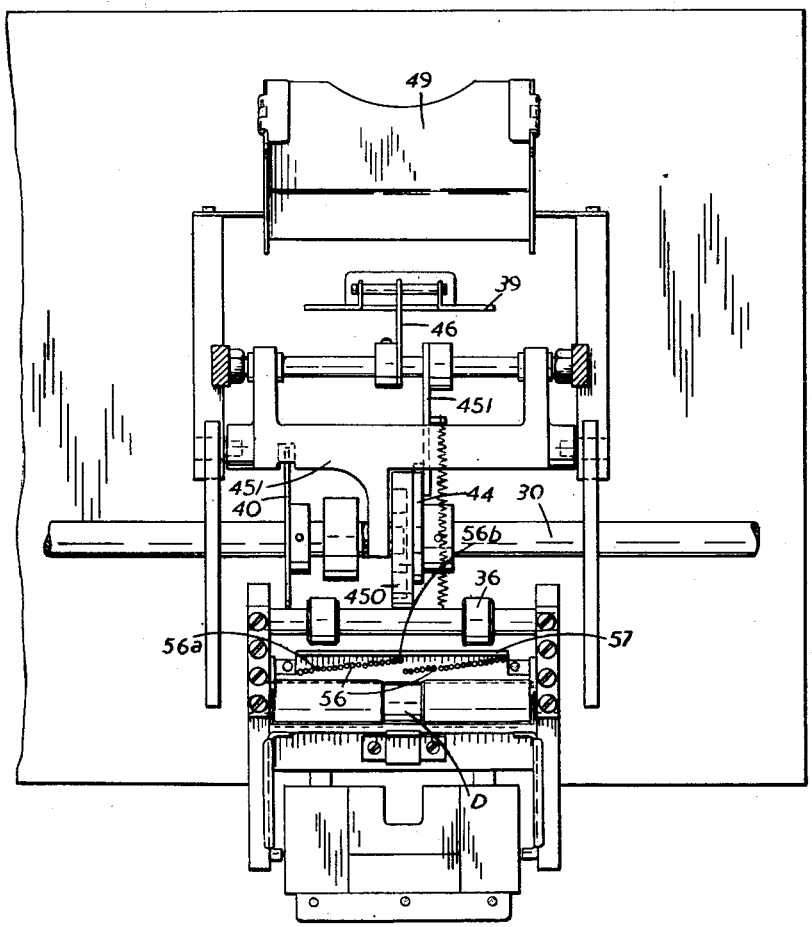

Figure 2 is a perspective view of the machine viewed from the side and rear, some parts being omitted for clarity, Figure 3 is a perspective view of a part of the upper portion of the machine, viewed from the rear, some parts being omitted, Figure 4 is a perspective view of a part of the upper portion of the machine, viewed from the front, some parts being omitted, Figure 5 is a diagrammatic plan view of a part of the machine to a reduced scale, Figure 6 is a diagrammatic front elevation of Figure 5, Figure 7 is a section, to an enlarged scale, through the card feeding, sensing and punching mechanisms on line VII—VII, Figure 5, Figure 8 is a plan of a part of Figure 7, Figure 9 is a view of a part of Figure 4 looking in the direction of arrow "A" and drawn to an enlarged scale, Figure 10 is an end view of Figure 1C, Figures 11A to 11Q taken together show a wiring diagram of the machine.

Figure 13B:
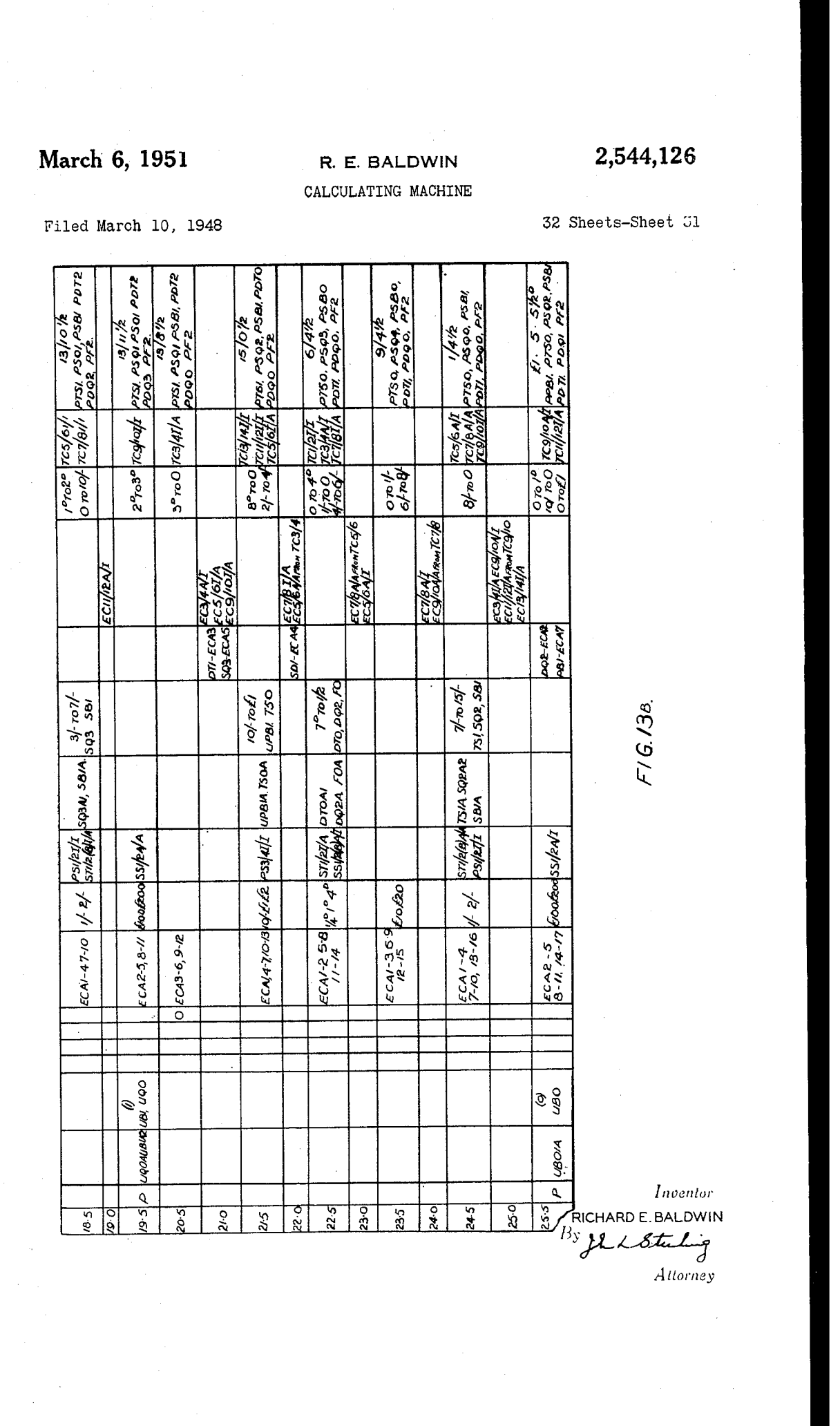
Figure 13C:
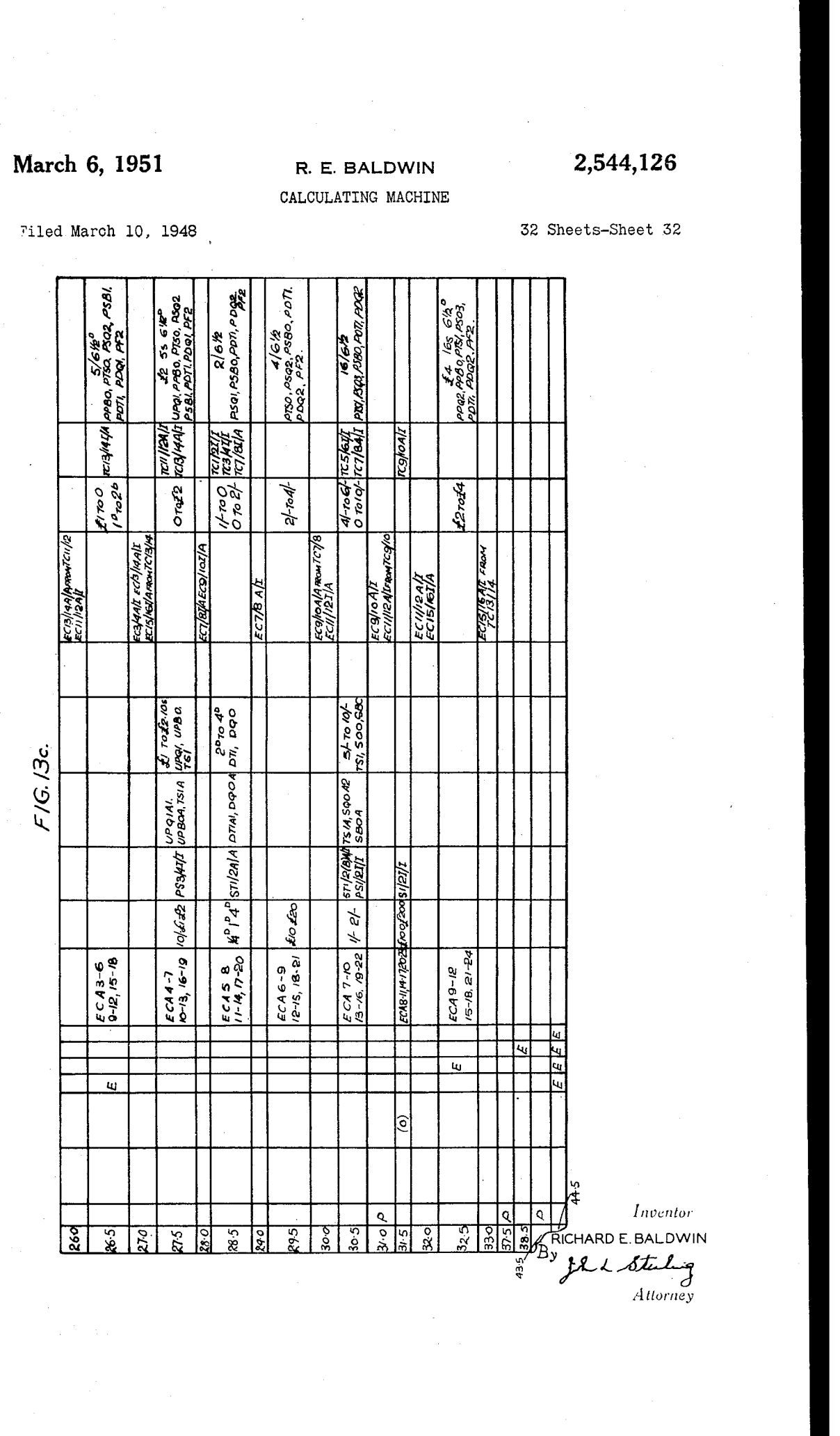

Figure 12 is a diagram showing the order of assembly of Figures 11A to 11Q in order to make up the complete wiring diagram and Figures 13A, 13B, 13C taken together are a table showing the order in time in which connections are made when effecting a calculation given by way of example.

*Card feeding and sensing mechanism*

The machine described herein is arranged to operate on the well-known Powers 36 column card although it will be readily appreciated that other types of card can be employed.

Referring to Figures 1A, 2, 7 and 8, cards are fed in the usual manner, longer edge first, from a magazine 20 by means of a reciprocating picker 21 mounted to slide on rods 22. Reciprocating movement of the picker 21 is obtained through a U-shaped bracket 23 mounted on a spindle 24 and having slots 25 at the outer ends of its limbs to engage pins 26 on the carriage 27 supporting the picker. Oscillation of the spindle 24 is effected by links 27, 28 and a cam 29 on a cross shaft 30. The cross shaft 30 is driven from the main shaft 31 through gears 32 and 33 (Fig. 9), and the main shaft is driven by a belt drive 34 from an electric motor 35, Figures 2, 5 and 6.

The picker 21 feeds a card to feed rolls 36 which move it past the sensing position and against a stop 37, Figure 7, which retains the card in a waiting position until it is fed by further feed rolls 38 against a second stop 39 which locates the card in position beneath a punching unit.

The first stop 37 is moved into and out of card arresting position by a cam 40 on the cross shaft 30, the cam engaging an arm 41 fixed on pivot spindle 42 to which the stop 37 is also secured. A spring 43 urges the arm 41 towards the cam 40.

The second stop 39 is also operated from the cross-shaft 30 by a cam 44, lever 45 and pivoted arm 46 which moves the stop 39 between vertical guides, not shown, against the action of spring 48.

After being released by the second stop 39, the card is delivered into a receiving magazine 49.

The sensing mechanism comprises two lamps 50, 51 mounted on a shield 52 supported on vertical rods 53 above the sensing position. Each of these lamps is adjustable vertically by screws 54 against the action of springs 55, so as to permit the images of the lamp filaments to be focussed on apertures 56 in a plate 57 beneath which the card is fed by the feed rolls to the stop 37.

Two rotatable discs 58, 59 are disposed one beneath each lamp to be between the lamps and the apertured plate 57, the discs being mounted on vertical spindles 60, 61 which are rotated by gears 62, 63 meshing through idlers 62a, 63a with gears 64, 65 on a spindle 66 driven from the main shaft 31 by gears 67, 68, Fig. 5. In each disc 58, 59 there is provided a number of lenses 69 equi-spaced round the disc and arranged to focus the image of its associated lamp filament on the appropriate group of apertures 56 in the plate.

As can be clearly seen from Figure 8, the apertures 56 in the plate 57 are arranged in two groups, the apertures of each group being disposed to be slightly in advance one of the other in the direction of movement of the card past the sensing position as indicated by the arrow D.

As the card to be sensed is a 36 column card, each group contains 18 apertures and the distance between the extreme apertures 56a and 56b, considered in the direction of movement of the card past the sensing position, is equal to the pitch of consecutive horizontal rows or lines of index positions on a card. Generally, it will not be desired to scan all of the apertures in each group because the multiplier and the multiplicand will be disposed in selected fields of the card. To avoid scanning columns other than those in the selected multiplier and multiplicand, field shields, not shown, are disposed over the aperture through which it is desired that the beams of light shall not pass. By using suitable shields the fields to be scanned can be varied.

One of the lenses 69 focuses the filament image successively on each of the apertures of the selected field of its associated group, starting at the left of Figure 8 and ending at the right thereof, and by this means each index position in the horizontal row of the selected card field is successively sensed as the card is fed forward a distance equal to the pitch between successive horizontal rows or lines of the card. As sensing of one row is completed the first position of the next horizontal row of the card field reaches the sensing position 56a and the next lens 69 in the disc becomes operative. This sensing action continues until each horizontal row or line of index positions of the card has been moved past the sensing position and the card has been arrested by the first stop 37.

Although the action of only one of the discs has been described it will be appreciated that both discs operate identically and simultaneously in co-operation with their appropriate associated groups of apertures.

Should the light directed on to the apertures 56 pass through a perforation in the card as it moves past the sensing position and becomes aligned with an aperture 56, the light passing through the perforation in the card impinges against a reflector 70, Figure 6, which directs the light on to a photo-electric cell 71. A reflector 70 and cell 71 is provided for each group of apertures 56 and the cells are connected with amplifier units comprising a first stage amplifying valve 72, Figure 11A, and a second stage amplifying valve 73.

When the light encounters a perforation in a card, it passes through and falls on the photo-cell cathode, whereby the cell is momentarily excited, causing a negative pulse which is amplified by the valves 72, 73, so that an amplified pulse is available at the output of the valve.

Thus for each perforation sensed on a card, a negative pulse is emitted from the amplifier unit. The digital value of each pulse is represented by the time in the cycle at which the pulse occurs and in order to enter the digits into the multiplier and multiplicand registers, the mechanism described below is employed.

The multiplying apparatus is shown diagrammatically in Figures 1C and 10, and consists of rings of valves mounted in frames 74 pivoted at 75 to a supporting stand 76. The frames are so pivoted as to open bookwise to facilitate adjustment of the valves or connections on the frames. The multiplier and multiplicand registers respectively comprise denominational rings of valves and in order to secure higher speed of operation and a greater margin of safety from the electrical point of view, each decimal denomination is divided into two sub-denominations the lower of which is binary while the higher sub-denomination is quinary, so that for each decimal denomination there are two rings of valves, one of which comprises two valves and the other five valves.

The machine now being described is constructed to handle sterling multiplicands and the pence denomination is divided into two sub-denominations, of which the lower is quaternary, being represented by a ring of four valves, while the higher is ternary, being represented by a ring of three valves.

Accordingly, in the system of notation employed in the multiplier and multiplicand registers, the ordinary decimal numbers appear as shown in the following table, the pence being represented as also shown in this table

| Decimal Numbers | Tens | | Units | | Pence | Ter. | Quat. |
|---|---|---|---|---|---|---|---|
| | Q | B | Q | B | | | |
| 0 | -- | -- | 0 | 0 | 0 | 0 | 0 |
| 1 | -- | -- | 0 | 1 | 1 | 0 | 1 |
| 2 | -- | -- | 1 | 0 | 2 | 0 | 2 |
| 3 | -- | -- | 1 | 1 | 3 | 0 | 3 |
| 4 | -- | -- | 2 | 0 | 4 | 1 | 0 |
| 5 | -- | -- | 2 | 1 | 5 | 1 | 1 |
| 6 | -- | -- | 3 | 0 | 6 | 1 | 2 |
| 7 | -- | -- | 3 | 1 | 7 | 1 | 3 |
| 8 | -- | -- | 4 | 0 | 8 | 2 | 0 |
| 9 | -- | -- | 4 | 1 | 9 | 2 | 1 |
| 10 | -- | 1 | 0 | 0 | 10 | 2 | 2 |
| 11 | -- | 1 | 0 | 1 | 11 | 2 | 3 |
| 12 | -- | 1 | 1 | 0 | ------ | ---- | ---- |
| 13 | -- | 1 | 1 | 1 | ------ | ---- | ---- |
| 14 | -- | 1 | 2 | 0 | ------ | ---- | ---- |
| 15 | -- | 1 | 2 | 1 | ------ | ---- | ---- |
| 16 | -- | 1 | 3 | 0 | ------ | ---- | ---- |
| 17 | -- | 1 | 3 | 1 | ------ | ---- | ---- |
| 18 | -- | 1 | 4 | 0 | ------ | ---- | ---- |
| 19 | -- | 1 | 4 | 1 | ------ | ---- | ---- |
| 20 | 1 | 0 | 0 | 0 | ------ | ---- | ---- |
| 30 | 1 | 1 | 0 | 0 | ------ | ---- | ---- |
| 40 | 2 | 0 | 0 | 0 | ------ | ---- | ---- |
| 50 | 2 | 1 | 0 | 0 | ------ | ---- | ---- |
| 60 | 3 | 0 | 0 | 0 | ------ | ---- | ---- |

In the following description, these sub-denominations will be referred to as the units-binary sub-denomination, units-quinary sub-denomination, tens-binary, tens-quinary, and so on.

In the multiplier register the units-binary valves are indicated at UB0 and UB1, (Fig. 11E), the units-quinary valves at UQ0, UQ1, UQ2, UQ3, and UQ4, while the tens-binary valves are indicated at TB0, and TB1, (Fig. 11D), and the tens-quinary valves at TQ0, TQ1, TQ2, TQ3, TQ4. In the diagram only the units and tens valves are shown.

In the multiplicand register the farthings valves are shown at F0, F1, F2, F3 (Fig. 11J), the pence-quaternary valves are shown at DQ0, DQ1, DQ2, DQ3, the pence-ternary valves at DT0, DT1 and DT2 (Fig. 11I), while the shillings-binary valves are shown at SB0, SB1 (Fig. 11I), and the shillings-quinary valves at SQ0, SQ1, SQ2, SQ3 and SQ4 (Fig. 11H). In the tens of shillings denomination, which is binary, there are two valves TS0 and TS1 (Fig. 11H).

The units of pounds denomination and higher pounds denominations, being decimal, are each divided into two sub-denominations, the lower denomination being binary and the higher denomination being quinary. The valves for the units of pounds binary sub-denomination are shown at UPB0 and UPB1 (Fig. 11G), while the corresponding quinary valves are shown at UPQ0, UPQ1, UPQ2, UPQ3 and UPQ4. The wiring of the valves in the higher denominations of pounds is the same as that for the units of pounds.

The cathodes of all the valves may be of the directly heated or of the indirectly heated type and are excited by a common supply.

In each ring the valves are so interconnected, and the potentials applied to them are such that all valves in any one ring are in the conducting state, except one, which is in the non-conducting state, this one non-conducting valve signifying the value of the digit registered in the sub-denomination to which the ring concerned appertains. Thus when the multiplier and multiplicand registers are at zero, the "0" valve in each sub-denomination is non-conducting.

In order to enter a digit into any sub-denomination of either register, the negative pulse emanating from the photo-cell circuit due to the reading of the corresponding record hole in the card is applied, by the means described below, to the grid of the valve representing the digit in question. Thus the decimal digit "8," which appears as "4" in the units-quinary sub-denomination, is entered by applying the pulse to the grid of the No. "4" valve in the units-quinary ring.

Assuming that the multiplier units-quinary sub-denomination for example, was registering zero before application of this pulse, then the "0" valve UQ0 was non-conducting and all the other valves including the "4" valve UQ4 were conducting. Application of the pulse to the grid of the "4" valve UQ4 renders this valve non-conducting which, in turn renders the "0" valve UQ0 conducting, the other valves remaining in the conducting state.

Hence after the application of the pulse the "4" valve UQ4 is non-conducting, while all the other valves are conducting, that is to say the digit "4" is registered in the units-quinary sub-denomination of the multiplier register.

The connections of the valves for achieving this result will be described later.

As can be seen from the above description, many of the single digit values read from the card appear as two digits in the notation with which the registers are adapted to deal, and means is therefore provided for converting the digit read from the card to this notation.

To this end the pulses which emanate from the photocell circuit as a result of the sensing of holes in the card, are passed to the multiplier and multiplicand registers through four distributors arranged in two pairs each consisting of two rings, one such pair being to connect the pulses to the binary rings of valves and the other pair to connect them to the quinary rings.

The binary distributors are shown at 80 and 80a in Figs. 3, 5 and 11A and the quinary distributors at 81, 81a in Figs. 3, 5 and 11B. The brushes 82, 82a and 83, 83a, of the four distributors are secured to a shaft 77, Figs. 4, 5 and 11B, which rotates at 740 revolutions per minute and is driven from the main shaft 31 by gears 78, 79, Fig. 4.

Each distributor has disposed around its periphery a number of banks of contacts, there being one bank of contacts for every horizontal row or line in the multiplier and multiplicand fields of the card. The distributors 80, 81 appertain to rows in the upper half of a card and the distributors 80a, 81a to the rows in the lower half of the card. The multiplicand binary contacts are indicated by the generic reference 84, the multiplicand quinary contacts as 85 and the multiplier binary and quinary contacts are indicated at 86 and 87 respectively.

In each bank of distributor contacts there is a contact corresponding to each index point position on the card which gives a significant digit in the binary or quinary sub-denomination to which the bank in question appertains.

For example, in the multiplier units denomination, only the odd digits give rise to a digit in the units-binary sub-denomination, and this digit is always unity. Accordingly there are five contacts 86u in the multiplier units bank on the binary distributor 80, 80a, these five contacts being angularly spaced according to the decimal digits 1, 3, 5, 7, 9, but all being connected, as explained below, to the No. 1 valve UB1 in the units-binary ring of the multiplier register.

The output lead 88, Fig. 11A, from the photo-cell unit output valve 73 is connected to brushes 89, then through contacts 90 on a revolving drum 91, secured to the shaft 30, Figs. 4, 5 and 11A, which contacts 90 connect the lead 88 through brushes 92, 92a and leads 94, 94a to the distributors 80, 80a (Fig. 11A). The output lead 88 is also connected through brushes 89a, 89b contacts 90a on drum 91, brush 92b, and leads 95, 95a to the distributors 81, 81a.

The drum 91 rotates at 150 revolutions per minute corresponding to the rate of card feed and the arc embraced by the contact strips 90 and 90a correspond to the portion of the revolution of the drum 91 which is equivalent to the time taken for the multiplicand and multiplier fields on the card to pass the sensing station.

The timing of the contact drum 91, and of the distributor brushes 82, 82a and 83, 83a and the spacing of the distributor contacts are such that when any index point position in the multiplier and multiplicand fields is at the sensing station, the brushes 82, 82a and 83, 83a are in engagement with contacts representing the value of that index point position in the binary-quinary notation which the registers are adapted to handle. Thus, for example, when the seven index point position in the units multiplier column is in position for sensing, the binary brush 82 is on the number "1" contact in the units group of contacts 86u on the binary distributor 80, and the quinary brush 83a is on the number "3" contact in the units group 87u of the quinary distributor 81a whereby the value seven is transmitted as "3," "1" to the multiplier register, the "1" being entered into the units binary ring and the "3" into the units-quinary ring.

The connections from the distributors 80, 80a and 81, 81a to the valve rings of the two registers are as follows: Dealing first with the units denomination of the multiplier on the card which, as stated above, is represented in the multiplier register by a binary sub-denomination containing a ring of two valves and a quinary sub-denomination containing a ring of five valves, it will be understood that only the odd multiplier digits produce an entry into the binary sub-demomination and that the digit entered is always unity. Accordingly, the five contacts in the units multiplier bank 86u, are all connected through a common wire 100u, Figs. 11A, 11B and 11E containing a resistance 102u, Fig. 11E, to the grid of the units binary valve UB1 which represents the digit "1" in the units binary sub-denomination.

Similarly, the tens bank of five multiplier contacts 86t, Fig. 11A, are all connected to a common wire 100t containing a resistance 102t, to the grid of the valve TB1, Fig. 11D, which represents the digits "1" in the tens binary sub-denomination. This wire 100t, in common with the other wires emanating from the distributors passes through a panel 303, Figs. 2, 3 and 11B which is mounted between guides 303a to be slidable therebetween so that it can be removed. The panel contains a socket corresponding to each index position on a record card and selection of the fields for distribution can be effected by making the desired connections through the panel.

Similarly, in each of the higher denominations, the respective bank, for example, the hundreds bank, 86h, has five contacts all connected to the units valve in the corresponding binary sub-denomination.

Referring now to the quinary groups of multiplier contacts on distributor 81, 81a, Fig. 11B, the decimal digit "1" read from the card gives rise to zero in the quinary sub-denomination. The decimal digits "2" and "3" both give rise to the quinary digit "1"; "4" and "5" give rise to the quinary digit "2"; "6" and "7" give rise to the quinary digit "3," while "8" and "9" give rise to the quinary digit "4." Accordingly, in the units quinary multiplier bank 87u, the contacts corresponding to the decimal digits "2" and "3" are connected through wire 107u1, Figs. 11B and 11E, including a resistance 102u1, to the grid of the valve UQ1 which represents the digit "1" in the units quinary denomination. In a similar manner, each of the succeeding pairs of contacts are connected through correspondingly identified wires 107u2, 107u3, 107u4 to the valves UQ2, UQ3 and UQ4.

In like manner, the successive pairs of contacts in the tens quinary bank 87t are connected through wires 107t1, 107t2 . . . to the grids of the valves TQ1, TQ2 . . . of the tens quinary sub-denomination, the valves of the higher quinary denominations being similarly connected to the corresponding groups of contacts 87 (not shown).

Referring now to the multiplicand register, this includes four valves F0, F1, F2 and F3, Fig. 11J, in the farthings denomination, representing respectively zero, ¼d., ½d. and ¾d.

The multiplicand register also comprises for the pence denomination a ring of four valves DQ0, DQ1 . . . in the quaternary sub-denomination and a ring of three valves DT0, DT1, DT2, Fig. 11I, in the ternary sub-denomination.

In the pence quaternary sub-denomination the digit "1" may be derived from any of the pence digits one penny, five-pence, and nine-pence, the digit "2" may be derived from two-pence, six-pence or ten-pence while the digit "3" may be derived from three-pence, seven-pence or eleven-pence.

In order to effect the desired conversion the binary distributors 80, 80a are provided with pence contacts 84d of which the penny, five-pence and nine-pence contacts are connected through a wire 112q, Figs. 11A and 11J, to the grid of valve DQ1, the two-pence, six-pence and ten-pence contacts are connected through wire 212q to the grid of valve DQ2 and the three-pence, seven-pence and eleven-pence contacts are connected through wire 312q to the grid of valve DQ3.

In the pence ternary sub-denomination the digit "1" may be derived from four-pence, five-pence, six-pence or seven-pence and the digit "2" from eight-pence, nine-pence, ten-pence or eleven-pence and in order to effect the conversion, the quinary distributors 81, 81a are provided with contacts 85d which are connected to the pence ternary valves Dt as follows: The four-pence, five-pence, six-pence and seven-pence contacts 85d are connected through wire 112t, Fig. 11B, to the grid of valve DT1, Fig. 11I, and the eight-pence, nine-pence, ten-pence and eleven-pence contacts are connected through wire 212t to the grid of valve DT2.

It is here pointed out that the farthings digits are entered in a similar manner through wires 112f, 212f and 312f (Fig. 11J). The farthings contacts are on distributor 80, 80a.

In the shillings denomination of the multiplicand register there are two sub-denominations, one binary, containing a ring of two valves SB0 and SB1, Fig. 11I, and the other quinary containing five valves SQ0 . . . SQ4, Fig. 11H. Of these, the grid of valve SB1 is connected to the odd units of shillings contacts 84s on the binary distributor 80 through wire 113b, Figs. 11A and 11I, in the same manner as the valve UB1 in the multiplier register is connected to contacts 86u. Similarly, the valves SQ are connected to the contacts 85s on the distributor 81 through wires 113q, 213q, 313q, 413q, Figs. 11B and 11H, in the same manner as the valves UQ in the multiplier register are connected to the contacts 87u.

In the tens of shillings denominations of the multiplicand register there are two valves only, TS0 representing 0, and TS1, Fig. 11H, representing one unit (equals 10/–). The grid of valve TS1 is connected to the 10/– contact 84t on the binary distributor 80, through wire 114.

In the units of pounds denomination and each higher pounds denomination, the number and arrangement of valves and their connection to the contacts of the distributors 80 and 81 is the same as for the units of shillings denomination, the contacts and connecting wire for the units of pounds binary valve UPB1, Fig. 11G, being indicated at 84up and 115b respectively and the contacts and wires for the corresponding quinary valves UPQ being indicated at 85up and 115q, 215q, 315q, 415q, respectively.

The arrangement of the valves of the multiplier and multiplicand registers to permit entry of the factors in the above described manner is as follows:

The cathodes of the valves are of the directly and indirectly heated types and are excited by a common supply. Each anode is connected by a resistance 120, Fig. 11J, to the positive supply line PL and the grid of each valve is connected by resistances 121 to the anodes of all the other valves in the ring and through a resistance 122 to the negative supply line NL.

Assuming that the register is at zero, then the grid potential of the zero valve in each ring will be biased negatively well beyond the cut-off value, that is to say the zero valves will be non-conducting. All the other valves will have their anodes at slightly positive potential.

If a negative pulse is applied through wire 107U4 to the grid of valve UQ4, Fig. 11E, in the multiplier units-quinary ring, for example, then this pulse, which is sufficiently strong to overcome the biasing effect of the other valves of the ring, biases the grid potential of valve UQ4 negatively beyond cut-off, whereby valve UQ4 becomes non-conducting.

Consequently its anode potential rises and since this anode is connected through resistance to the grids of the other four valves of the ring, UQ0, UQ1, UQ2, UQ3, the potentials of all these grids are also raised by a fraction of the rise in anode potential of valve UQ4, said fraction being determined by the values of the resistance.

Three of the valves, namely, UQ1, UQ2, UQ3 are already in the conducting state and accordingly this rise in their grid potentials does not alter their state.

Valve UQ0, however, was in the non-conducting state, and the rise in its grid potential is enough to charge it positively to an extent sufficient to bring it into the conducting state. As valve UQ0 is now in the conducting state, its anode potential drops, thus supplying the necessary bias to retain valve UQ4 in the non-conducting state, and reducing the temporarily raised grid potentials of valves UQ1, UQ2, UQ3 to their normal values, which however, are still positive so that these three valves remain conducting.

In the manner explained above, the two factors are entered into the multiplier and multiplicand registers and they are multiplied by the method of halving the multiplier and doubling the multiplicand. At each stage in this procedure an indication is given by means explained later as to whether the multiplier is odd or even, and when the multiplier is odd the contemporaneous multiplicand is entered into a product register, the sum of all the multiplicands thus entered being the final product of the two factors.

As the factors are entered into the multiplier and multiplicand registers in the particular notation described above the product contained in the product register is also in this notation and means are provided, which will be described later, for converting the product from the notation in which the multiplication is effected, into the sterling notation, thereby giving the result in pounds, shillings and pence.

In the case of the multiplier, each binary sub-denomination the digit of the result obtained by dividing by two, that is to say halving, depends on the values of the digits in the two sub-denominations above, for example, the units binary digit of half the multiplier will depend on the units quinary digit and the tens-binary digit in the original multiplier.

Thus in any binary sub-denomination the digits "0" and "1" may be derived as follows:

"0" may be derived from "0" or "2" or "4" in the same quinary sub-denomination occurring together with "0" in the next higher binary sub-denomination; or from "1" or "3" in the same quinary sub-denomination occurring together with "1" in the next higher binary sub-denomination.

"1" may be derived from "0" or "2" or "4" in the same quinary sub-denomination occurring together with "1" in the next higher binary sub-denomination or from "1" or "3" in the same quinary sub-denomination occurring together with "0" in the next higher binary sub-denomination.

In each quinary sub-denomination the digits of the result obtained by dividing by two depends on the value of the original multiplier digit in the same sub-denomination and also on the value of the original multiplier digit in the sub-denomination above, for example, in the units quinary sub-denomination the value of the digit of half the multiplier depends on the units quinary digit of the original multiplier and also on the tens-binary digit of the original multiplier.

Thus in any quinary sub-denomination the multiplier register the digits "0," "1," "2," "3," and "4" may be derived as follows:

"0" may be derived from "0" or "1" in the same sub-denomination occurring together with "0" in the next higher sub-denomination.

"1" may be derived from "2" or "3" in the same sub-denomination occurring together with "0" in the next higher sub-denomination.

"2" may be derived from "4" in the same sub-denomination occurring together with "0" in the next higher sub-denomination, or from "0" in the same sub-denomination occurring together with "1" in the next higher sub-denomination.

"3" may be derived from "1" or "2" in the same sub-denomination occurring together with "1" in the next higher sub-denomination.

"4" may be derived from "3" or "4" in the same sub-denomination occurring together with "1" in the next higher sub-denomination.

The halving operation is performed by applying a pulse to the grid of the valves which are to register the digits of half the previous value registered in the multiplier register.

In the manner explained below these pulses are applied at 0.01 second intervals to a common pulse input lead and the registering valves whose grids are to receive them are selected by means of certain other valves, hereinafter referred to as attendant valves.

Each registering valve in any multiplier binary ring is provided with one attendant valve for each digit in the next higher sub-denomination but one from which the digit corresponding to said registering valve may be derived in a halving operation.

Thus in the multiplier units-binary ring, the "0" valve UB0, Fig. 11E, has two attendant valves UB0A1 and UB0A2, since in half the multiplier the units-binary digit "0" may arise if the original multiplier contains either of the digits "0" or "1" in the tens-binary sub-denomination.

In the multiplier units-binary ring the "1" valve UB1 also has two attendant valves UB1A1 and UB1A2, since in half the multiplier the units-binary digit "1" may arise if the original multiplier contains either of the digits "0" or "1" in the tens-binary denomination.

In each multiplier quinary ring each registering valve is provided with one attendant valve for each digit in the next higher sub-denomination from which the digit corresponding to said registering valve may be derived in a halving operation.

Thus in the multiplier units-quinary ring the "0" valve UQ0 has one attendant valve UQ0A since in half the multiplier the units-quinary digit "0" may arise if the original multiplier contains the digit "0" in the tens-binary denomination.

The "1" valve UQ1 also has one attendant valve UQ1A since in half the multiplier the units-quinary digit "1" may arise if the original multiplier contains the digit "0" in the tens-binary denomination.

The "2" valve UQ2, however, has two attendant valves UQ2A1 and UQ2A2 since in half the multiplier the units-quinary digit "2" may arise if the original multiplier contains either of the digits "0" or "1" in the tens-binary denomination.

The units-quinary registering valves UQ3 and UQ4, have only one attendant valve each, namely UQ3A and UQ4A since in the original multiplier only one hundreds-binary digit, namely the digit "1," is involved in the derivation of the tens-quinary digits "3" and "4" of half said multiplier.

In the following description the registering valves corresponding to digits from which a digit in half the multiplier may be derived will be called controlling valves for the registering valve corresponding to said digit in half the multiplier.

For example, as stated above, in the units-quinary denomination, the digits "2" will arise in half the multiplier if the original multiplier contains the digit "4" in the units-quinary denomination together with the digit "0" in the tens-binary denomination, or if the original multiplier contains the digit "0" in the units-quinary denomination together with the digit "1" in the tens-binary denomination. Accordingly the controlling valves for the No. "2" registering valve UQ2 in the units-quinary ring are the "0" and "4" registering valves UQ0 and UQ4 in the units-quinary ring, and the "0" and "1" registering valves TB0 and TB1 in the tens-binary ring.

The function of the attendant valves is to pass a pulse from the pulse input line, which is receiving pulses at 0.01 second intervals, to the corresponding registering valve under control of the aforementioned controlling valves.

To this end the multiplier attendant valves are connected as follows:

The anode of each attendant valve is connected to the grid of the associated registering valve through a resistance 126 and lead 127, Fig. 11E.

Considering the units-binary ring the first attendant valve UB0A1 for the registering valve UB0 has its grid connected through resistance 130 and lead TB0L, Fig. 11E, to the anode of the tens-binary registering valve TB0, Fig. 11D, and also through resistances 131 and leads UQ0L, UQ2L and UQ4L to the anodes of the units-quinary registering valves UQ0, UQ2, and UQ4, the valves TB0, UQ0, UQ2, and UQ4, being the valves which control valve UB0 through attendant valve UB0A1.

The second attendant valve UB0A2 for valve UB0 has its grid connected through a resistance 130 and lead TB1L to the anode of the tens-binary valve TB1, Fig. 11D, and also through resistances 131 and leads UQ1L, and UQ3L to the anodes of the units-quinary registering valves UQ1 and UQ3 the valves TB1, UQ1 and UQ3 being the valves which control valve UB0 through attendant valve UB0A2.

The first attendant valve UB1A1 for the units-binary registering valve UB1 has its grid connected through a resistance 130 and lead TB1L to the anode of the tens-binary valve TB1 and also through resistances 131 and leads UQ0L, UQ2L and UQ4L to the anodes of the units-quinary registering valves UQ0, UQ2 and UQ4.

The second attendant valve UB1A2 for the valve UB1 has its grid connected through a resistance 130 and lead TB0L to the anode of the tens-binary valve TB0 and also through resistances 131 and leads UQ1L and UQ3L to the anodes of the units-quinary registering valves UQ1 and UQ3.

In the units-quinary ring the attendant valves for the five registering valves UQ0, UQ1 . . . are connected as follows:

The single attendant valve UQ0A for the registering valve UQ0 has its grid connected through a resistance 130 and lead TB0L, to the anode of the tens-binary valve TB0 and also through resistances 131 and leads UQ0L and UQ1L, to the anodes of the units-quinary valves UQ0 and UQ1.

The attendant valve UQ1A for valve UQ1 has its grid connected through a resistance 130 and lead TB0L to the anode of valve TB0 and also through resistances 131 and leads UQ2L and UQ3L, to the anodes of valves UQ2 and UQ3.

The units-quinary registering valve UQ2 has two attendant valves, of which valve UQ2A1 has its grid connected through resistance 130 and lead TB0L to the anode of TB0 and through resistance 131 and lead UQ4L to the anode of valve UQ4.

The other attendant valve UQ2A2 has its grid connected through resistance 130 and lead TB1L to the anode of TB1 and through resistance 131 and lead UQ0L, to the anode of UQ0.

Valve UQ3 has but one attendant valve UQ3A, of which the grid is connected through resistance 130 and lead TB1L to the anode of TB1 and through resistances 131 and leads UQ1L and UQ2L to the anodes of UQ1 and UQ2.

Lastly, valve UQ4 also has only one attendant valve UQ4A, of which the grid is connected through resistance 130 and lead TB1L to the anode of TB1 and through resistances 131 and leads UQ3L and UQ4L to the anodes of UQ3 and UQ4.

The connections of the valves in the higher sub-denominational rings of the multiplier register are the same as those for the units rings, see for example, the tens-binary and quinary rings in Fig. 11D.

The grids of all the attendant valves UB0A1 . . . UQ4A are connected through resistances 136 to the negative line NL and the resistances are such that normally all these grids are negative.

The anodes of all attendant valves are connected through resistances 128 to the positive line PL.

During the operation of the machine, there will be one registering valve in each sub-denominational ring which is in the non-conducting state, that is the valve which corresponds to the digit registered in that sub-denomination. When there are two attendant valves to control one registering valve, the anodes of the two are connected to one common resistance 128.

Consequently, the grid of the attendant valve in respect of which this non-conducting registering valve is a controlling valve, will have its potential raised above the normal value although still below cut-off, the anode of the said registering valve being coupled to the grid of the said attendant valve as described above.

If two of the controlling registering valves to the anodes of which the grid of an attendant valve is coupled, are non-conducting, then the grid of that attendant valve will have its potential raised still higher to a point just below cut-off. An attendant valve of which the grid is thus at a potential just below cut-off will hereinafter be referred to as being in the "ready" condition.

In the case of the lowest denomination, that is farthings, the value ½d. will derive from the doubling of ¼d. or ¾d.; the zero value will derive from the doubling of ½d. or "0," thus the attendant valves of these two valves are each controlled by two ring valves only one of which need be conducting to set the attendant valve in the "ready" condition.

If now a positive pulse of a given magnitude is applied to the grids of all the attendant valves simultaneously, the potentials of all these grids will be raised. The grids of the attendant valves of which all of the controlling valves are conducting, will still remain negative and the grids of the attendant valves of which only one controlling valve is non-conducting will also remain negative, although at a higher potential than in the case of attendant valve grids which are connected to two conducting valves. In the case of any attendant valve which was in the "ready" condition, the positive pulse will raise the grid potential beyond cut-off, so that this attendant valve becomes conducting.

This brings down the anode potential of this attendant valve with the result that the potential of the grid of the corresponding registering valve is lowered below cut-off thereby bringing this registering valve into the non-conducting state, in which it registers the digit which it represents.

Considering a numerical example, and assuming that the amount registered in the multiplier register is "8." In that case the No. "4" valve UQ4 in the units-quinary sub-denomination will be in the non-conducting (i. e. registering) state, and in all the remaining sub-denominations the No. "0" valve will also be non-conducting.

Accordingly the valves TQ0, TB0, Fig. 11D, UQ4 and UB0, Fig. 11E, will be non-conducting, as well as the No. "0" valve in each sub-denomination above the tens-quinary.

Since the valves TB0 and UQ4 are non-conducting the attendant valve UQ2A1 for the No. "2" valve UQ2 in the units-quinary sub-denomination will be in the "Ready" condition. Consequently, when the positive pulse is applied to the grids of all the attendant valves, the valve UQ2A will become conducting which will lower the grid potential of valve UQ2 below cut-off, so that the latter valve becomes non-conducting, and the digit "2" (half of the original digit "4") is now registered in the units-quinary denomination. At the same time valve UQ4 becomes conducting, i. e. ceases to register.

In the units-binary denomination, "0" was registered and accordingly the No. "0" valve UB0 was non-conducting. Since the tens-binary valve TB0 and also the valve UQ4 were both non-conducting, the attendant valve UB0A1 was in the "ready" condition. Accordingly the positive pulse makes the attendant valve UB0A1 conduct, whereby the grid potential of valve UB0 is lowered. As this potential was already below cut-off valve UB0 remains in the non-conducting state, so that "0" is still registered in the units-binary denomination.

In the tens-binary denomination "0" was registered, and accordingly the No. "0" valve TB0 was non-conducting. Since the No. "0" tens-quinary valve and also the No. "0" hundreds-binary valve were both non-conducting the attendant valve TB0A1 was in the "ready" condition. Accordingly as explained above for the valve UB0 the grid potential of valve TB0 is reduced, and as this potential was already below cut-off, the valve TB0 remains non-conducting so that "0" is still registered in the tens-binary denomination.

The action in the hundreds-binary sub-denomination, which was registering "0," and in binary sub-denominations above hundreds which were also registering "0" is the same as described above for the tens-binary sub-denomination, so that "0" continues to be registered in these sub-denominations.

Likewise in the hundreds and higher quinary sub-denominations, which were registering "0" the action is the same as for the units-quinary sub-denomination.

As a result, therefore, of the application of the positive pulse to the grids of all the attendant valves, the amount "4" is registered in the multiplier register instead of the previous amount "8," that is to say, the multiplier has been halved.

From the foregoing example it will be understood that the state of the registering valves to the anodes of which the grids of the attendant valves are coupled determines whether or not an attendant valve will be in the "ready" condition, and that an attendant valve will only be in the "ready" condition if two of the registering valves which control it are non-conducting. Further the registering valves to the anodes of which the attendant valve grids are respectively connected, are so selected that the attendant valves which are put into the "ready" condition are those corresponding to registering valves which represent the digits of half the amount whose digits are represented by the non-conducting registering valves which, by their non-conducting state, have put these attendant valves in the "ready" condition.

The above mentioned positive pulses, hereinafter termed halving pulses, are applied to the grids of the attendant valves through condensers 134, Figs. 11D and 11E, and a lead 136 through potential divider 137, Fig. 11D, contact 137a, Fig. 11C, and brushes 138 on shaft 31 which are connected to the positive line PL through leads 139, brushes 140 and by means of the initiating segment 141 on a drum 142 secured to the shaft 30 which is rotating at 150 revolutions per minute, that is to say, one revolution per card cycle.

The brushes 138, of which there four, are spaced around the shaft 31 at a pitch equal to ¼ of a revolution.

During sensing the initiating segment 141 is not in contact with the brushes 140 of which there are five pairs spaced at 1/40 of a revolution. The second, third, fourth and fifth brushes 140 are connected respectively to groups of contacts 137a round each quarter of the periphery of the shaft 31.

The shaft 31 rotates at 1500 revolutions per minute and the spacing of the brushes 138 effects application of the pulses at the rate of one pulse every 0.01 second.

At each pulse the multiplier is halved, and at the same time the multiplicand is doubled, by means explained later, and, as already mentioned, each time the multiplier becomes odd, the contemporaneous value of the multiplicand is entered into the product register. Also the halving of an odd multiplier gives rise, arithmetically, to the fraction one half, and since the multiplier register does not contain any valves for registering fractions, the halving of an odd multiplier results in the disappearance of the fraction and only the whole number portion of the value represented by half the previous multiplier remains in the multiplier register.

The anode of the No. "1" valve UB1 in the units-binary sub-denomination of the multiplier register is however connected to the grid of one valve of an Eccles-Jordan trigger pair of valves, which, in the manner explained below, control the entry of the multiplicand into the product register.

For reasons which will hereinafter appear four of these trigger pairs are provided, their function being to indicate whether the multiplier is odd or even, these odd/even indicator pairs being shown at 1E1, 1E2, 2E1, 2E2, 3E2, 4E1, 4E2, Fig. 11F.

The grid of one valve E1 of each of these odd/even indicator pairs of valves is connected in turn to the No. "1" valve UB1 in the units-binary sub-denomination of the multiplier register, through a brush EB1, EB2, EB3 and EB4, respectively, contact segment 255 on drum 256 secured to shaft 31 and thence through brushes 254, resistance 250 and lead 249 to the anode of valve UB1, Fig. 11E.

Shaft 31 rotates at 1,500 revolutions per minute and therefore the grid of the valve E1 of one odd/even indicator pair is connected to the anode of valve UB1 every 0.01 second, i. e., at the same rate as the halving pulses are applied to the grids of the multiplier register valves.

The above mechanism controls the entry of the multiplicand into the product register and its operation will be described later.

As in the case of the multiplier register, the function of the attendant valve for the multiplicand register valves is to pass a pulse from the pulse input line, which is receiving pulses at 0.01 second intervals, to the corresponding registering valve under control of the aforementioned controlling valves.

To this end the multiplicand attendant valves are connected as follows:

Considering the farthings denomination, which is the lowest denomination in the machine now being described, the farthings digit "0" can arise in double the multiplicand if the original multiplicand contained the digit "0" or the digit "2."

Therefore the attendant valve F0A for the farthings valve F0 has its grid coupled through resistance 130, Fig. 11J, and lead FL0 to the anode of valve F0 and through resistance 131 and lead FL2 to the anode of valve F2.

The farthings digit "2" can arise in double the multiplicand if the original multiplicand contained the farthings digit "1" or "3." Hence the attendant valve F2A for the valve F2 has its grid coupled through resistance 130 and lead FL1 to the anode of valve F1 and through resistance 131 and lead FL3 to the anode of valve F3.

Double the multiplicand cannot contain the digits "1" or "3" when the farthings denomination is the lowest in the machine. Accordingly, the valves F1 and F3 are not provided with attendant valves.

In the pence quaternary denomination the digit "0" can arise in double the multiplicand if any one of the following four combinations of pence quaternary and farthings digits occurs in the original multiplicand.

| Pence Quat. | Farthings |
|---|---|
| 0 | 0 |
| 0 | 1 |
| 2 | 0 |
| 2 | 1 |

Accordingly the grid of the attendant valve DQ0A for the pence quaternary valve DQ0 is coupled through resistance 170, Fig. 11J, and leads DQ0L and DQ2L to the anodes of pence quaternary valves DQ0 and DQ2 and also through resistances 171 and leads FL0 and FL1 to the anodes of farthings valves F0 and F1.

The pence quaternary digit "1" can arise in double the multiplicand if any one of the following four combinations of pence quaternary and farthings digits occurs in the original multiplicand.

| Pence Quat. | Farthings |
|---|---|
| 0 | 2 |
| 0 | 3 |
| 2 | 2 |
| 2 | 3 |

Accordingly the grid of attendant valve DQ1A is coupled through resistances 170 and leads DQ0L and DQ2L to the anodes of pence quaternary valves DQ0 and DQ2, and through resistances 171 leads FL2 and FL3 to the anodes of farthings valves F2 and F3.

For the pence quaternary digit "2" the determinative combinations are as follows:

| Pence Quat. | Farthings |
|---|---|
| 1 | 0 |
| 1 | 1 |
| 3 | 0 |
| 3 | 1 |

Accordingly the grid of attendant valve DQ2A is connected through resistances 170 and leads DQ1L and DQ3L to the anodes of valves DQ1 and DQ3 and through resistances 171 and leads FL0 and FL1 to the anodes of valves F0 and F1.

The pence quaternary digit "3" is determined by the following combinations:

| Pence Quat. | Farthings |
|---|---|
| 1 | 2 |
| 1 | 3 |
| 3 | 2 |
| 3 | 3 |

Accordingly the grid of attendant valve DQ3A is connected through resistances 170 and leads DQ1L and DQ3L to the anodes of valves DQ1 and DQ3 and through resistances 171 and leads FL2 and FL3 to the anodes of valves F2 and F3.

In the pence ternary sub-denomination of double the multiplicand the digits depend on the digits occurring in the pence ternary and quaternary denominations of the original multiplicand and the determinative combinations are as follows:

| Double Multiplicand, Pence Ternary Digit | Original Multiplicand | |
|---|---|---|
| | Pence Ternary Digit | Pence Quat. Digit |
| 0 | 0 | 0 |
| | 0 | 1 |
| | 1 | 2 |
| | 1 | 3 |
| 1 | 0 | 2 |
| | 0 | 3 |
| | 2 | 0 |
| | 2 | 1 |
| 2 | 1 | 0 |
| | 1 | 1 |
| | 2 | 2 |
| | 2 | 3 |

For each pence ternary registering valve two attendant valves are required, and these attendant valves are connected as follows:

Attendant valve DT0A1, Fig. 1, has its grid connected through resistance 170 and lead DT0L to the anode of pence ternary valve DT0, and also through resistances 171 and leads DQ0L and DQ1L respectively, to the anodes of the pence quaternary valves DQ0 and DQ1, Fig. 11J.

Attendant valve DT0A2 has its grid connected through resistances 170 and lead DT1L to the anode of pence ternary valve DT1, and also through resistances 171 and leads DQ2L and DQ3L respectively to the anodes of pence quaternary valves DQ2 and DQ3.

By similar connections which can be traced on the wiring diagram with the aid of the table of determinative combinations given above the attendant valve DT1A1 is connected to the valves DT0, and DQ2 and DQ3, while attendant valve DT1A2 is connected to valves DT2, DQ0 and DQ1.

Similarly attendant valve DT2A1 is connected to valves DT1, DQ0 and DQ1 while attendant valve DT2A2 is connected to valves DT2, DQ2 and DQ3.

In the units of shillings binary sub-denomination the digit of the result obtained by doubling the multiplicand will be "0" if there is no transfer from the pence ternary sub-denomination or "1" if there is such a transfer.

Accordingly the "0" and "1" valves SB0 and SB1, Fig. 11I, of the units of shillings binary sub-denomination each have one attendant valve SB0A and SB1A.

For a reason which will be explained later, however, the doubling of the units of shillings binary and quinary digits is effected later in the card cycle than the doubling of the pence-ternary and quaternary and farthings digits.

Accordingly if the doubling of the pence and farthings digits results in a transfer to shillings, then a set-up or registration representative of this transfer must be retained after the doubling of the pence and farthings digits, and until the doubling of the shillings digits takes place.

To this end a pair of transfer storage valves SS1 and SS2, Fig. 11I, is provided. These valves are wired as an Eccles-Jordan trigger pair.

There will be a transfer to shillings if the pence ternary digit of the original multiplicand is "2"; or if the pence ternary digit is "1" and the pence quaternary digit is either "2" or "3."

There will be no transfer to shillings if the pence ternary digit is "0"; or if the pence ternary digit is "1" and the pence quaternary digit is "0" or "1."

Accordingly the grid of the pence to shillings transfer storage valve SS1 is coupled through resistance 183 and load DT2L to the anode of the pence ternary valve DT2 and through resistance 181 and lead DQ2L to the anode of pence quaternary valve DQ2 and also through resistance 180 and lead DQ3L to the anode of pence quaternary valve DQ3.

The grid of the other pence to shillings transfer storage valve SS2 is coupled through resistance 185 and lead DT0L to the anode of pence ternary valves DT0 and through resistances 186 and 187 and leads DQ0L and DQ1L to the anodes of pence ternary valve DT1 and of pence quaternary valves DQ0 and DQ1.

The anodes of valves SS1 and SS2 are coupled through resistances 188 to the grids of attendant valves SB0A and SB1A respectively in the units of shillings binary denomination.

The values of the resistances 180, 181, 183, 185, 186, 187 are too high to upset the setting of the valves SS1, SS2, but when a positive pulse is applied to their common negative point, both valves are caused to conduct momentarily and thus take up their new setting.

In the units of shillings quinary sub-denomination of double the multiplicand the digits depend on the digits occurring in the units of shillings quinary and binary sub-denominations of the original multiplicand, and the determinative combinations are as follows:

| Double Multiplicand, Units of Shillings quinary digit | Original Multiplicand | |
|---|---|---|
| | Units of Shillings quinary digit | Units of Shillings binary digit |
| 0 | 0 | 0 |
|   | 2 | 1 |
| 1 | 0 | 1 |
|   | 3 | 0 |
| 2 | 1 | 0 |
|   | 3 | 1 |
| 3 | 1 | 1 |
|   | 4 | 0 |
| 4 | 2 | 0 |
|   | 4 | 1 |

Each units of shillings quinary registering valve has two attendant valves which are connected as follows:

The grid of attendant valve SQ0A1, Fig. 11H, is connected through resistance 170 and lead SB0L to the anode of the units of shillings binary valve SB0, and also through resistance 171 and lead SQ0L to the anode of the units of shillings quinary valve SQ0.

The grid of attendant valve SQ0A2 is connected through resistance 170 and lead SB1L to the anode of valve SB1, and also through resistance 171 and lead SQ2L to the anode of valve SQ2.

The grid of attendant valve SQ1A1 is connected through resistance 170 and lead SB1L to the anode to valve SB1, and also through resistance 171 and lead SQ0L to the anode of valve SQ0.

The grid of attendant valve SQ1A2 is connected through resistance 170 and lead SQ0L to the anode of valve SB0 and through resistance 171 and lead SQ3L to the anode of valve SQ3.

The grid of attendant valve SQ2A1 is connected through resistance 170 and lead SB0L to the anode of valve SB0 and through resistance 171 and lead SQ1L to the anode of valve SQ1.

The grid of attendant valve SQ2A2 is connected through resistance 170 and lead SB1L to the anode of valve SB1 and through resistance 171 and lead SQ3L to the anode of valve SQ3.

The grid of attendant valve SQ3A1 is connected through resistance 170 and lead SB1L to the anode of valve SB1 and through resistance 171 and lead SQ1L to the anode of valve SQ1.

The grid of attendant valve SQ3A2 is connected through resistance 170 and lead SB0L to the anode of valve SB0 and through resistance 171 and lead SQ4L to the anode of valve SQ4.

The grid of attendant valve SQ4A1 is connected through resistance 170 and lead SB0L to the anode of valve SB0 and through resistance 171 and lead SQ2L to the anode of valve SQ2.

Lastly the grid of attendant valve SQ4A2 is connected through resistance 170 and lead SB1L to the anode of valve SB1 and through resistance 171 and lead SQ4L to the anode of valve SQ4.

The digits registered in the tens of shillings, units of pounds group are doubled later in time than are the digits in the units of shillings group and it is therefore necessary to provide a pair of transfer storage valves ST1, ST2, Fig. 11H, to retain a set-up indicative of whether doubling the shillings quinary digit gives a transfer to tens of shillings or not.

Referring now to the tens of shillings denomination there will be a transfer to this denomination if the units of shillings quinary digit of the original multiplicand is either "3" or "4"; or if the units of shillings quinary digit is "2" and the units of shillings binary digit is "1."

There will be no transfer to the tens of shillings denomination if the units of shillings quinary digit is "0" or "1"; or if the units of shillings quinary is "2" and the binary digit is "0."

Accordingly the grid of the shillings to ten shillings transfer storage valve ST1, is coupled through resistances 180a and 181a, and leads SQ3L and SQ4L respectively to the anodes of the units of shillings quinary registering valves SQ3, and SQ4, and also through resistance 182a and lead SB1L to the units of shillings binary registering valve SB1.

Also the grid of the other shillings to ten shillings transfer storage valve ST2 is coupled through resistances 185a and 186a and leads SQ0L and SQ1L to the anodes of valves SQ0 and SQ1, and through resistance 187a to the anode of valve SB0.

The anodes of the transfer storage valves ST1 and ST2 are coupled through resistances 188a to the grids of attendant valves TS0A and TS1A respectively in the tens of shillings denomination.

In the units of pounds and all higher pounds binary and quinary sub-denominations the number of attendant valves and the connections of their grids to the anodes of the registering valves are as shown in Fig. 11G, and are the same as already described with reference to the units of shillings binary and quinary sub-denomination.

The tens of pounds digits are doubled later than the doubling of the digits in the tens of shillings, units of pounds group and accordingly a transfer storage pair of valves PS1 and PS2 is provided to control the transfer from units of pounds to tens of pounds.

Similarly the higher denominational pounds digits are doubled consecutively and a transfer storage pair of valves is provided between each pounds denominational group and the next higher group.

As in the case of the multiplier register the anode of each attendant valve or pair of valves in the multiplicand register is coupled through resistance 175 and lead 176, Fig. 11H, to the grid of the associated register valve, and through resistance 177 to the positive line PL. Also the grid of each attendant valve is connected through resistance 178 to the negative line NL.

Doubling is effected by applying a pulse under control of the respective attendant valves to the grids of the registering valves which are to register the digits of double the multiplicand.

The doubling of the digits in the different denominations is effected sequentially by means of successive pulses and each of these successive pulses occurs a predetermined number of 1/600 second time units later than the multiplier halving pulse as indicated by the following table:

| Time units after multiplier halving pulse | Doubling pulse |
|---|---|
| 3 | Farthings and pence (quaternary and ternary). |
| 5 | Units of shillings (binary and quinary). |
| 8 | Tens of shillings and units of pounds (binary and quinary). |
| 10 | Tens of pounds (binary and quinary). |
| 12 | Hundreds of pounds (binary and quinary). |
| 14 | Thousands of pounds (binary and quinary). |
| 16 | £10,000 (binary and quinary). |
| 18 | £100,000 (binary and quinary). |

The multiplier halving pulses, however, occur at intervals of six 1/600 second time units and each multiplier halving pulse is followed by the sequence of doubling pulses indicated in the table above. Accordingly it will be seen that before the doubling of any given multiplicand has been completed the doubling of double that given multiplicand has commenced and also the octupling of that given multiplicand.

In fact at any given instant the higher denominational sections of the multiplicand register may be registering the digits of one multiplicand, while the middle sections are registering the digits of twice that multiplicand and the lower denominational sections are registering the digits of four times said multiplicand.

Since the transfer storage pair of valves which controls the transfer into any section has to retain a setup depending upon the digits registered in the section from which said transfer is to come, each transfer storage pair receives a pulse at the same time as the section preceding the section from which the transfer is to come.

Since in the machine being described there is no group below the farthings-pence group, the transfer storage valves SS1 and SS2 which control the transfer from pence to shillings receive a pulse before the farthings-pence group receives its doubling pulse, and this pulse to the valves SS1, SS2 is conveniently applied at the same time as the multiplier halving pulse.

Three time units later a pulse is applied to the pence-farthings section and also to the transfer storage valves ST1 and ST2 which control the transfer from units of shillings to the tens of shillings, which latter are included in the same section as units of pounds for doubling purposes.

Two time units later a pulse is applied to the units of shillings section and also to the transfer storage valves PS1, PS2 which control the transfer from units of pounds to tens of pounds.

Similarly the pulse which effects doubling in the tens of shillings, units of pounds section is simultaneously applied to the transfer storage valves (not shown) which control the transfer from tens of pounds to hundreds of pounds.

The doubling pulses are applied to the grids of the multiplicand attendant valves by means of the initiating segment 141 on drum 142.

For each section of the multiplicand register which is to receive a doubling pulse there is provided a pair of contacts indicated by the generic references 210, 211, Fig. 11C, the contacts of each pair being connected in turn by the segment 141 on the drum 142. The contacts 210 are all connected to the common positive lead PL, and contact 211 is connected through an individual lead 213a, 213b, 213c . . . to the corresponding section of the multiplicand register and through a potential divider 214, Figs. 11G, 11H and 11I to zero potential.

The pence-shillings transfer storage pair of valves SS1, SS2 receive a pulse before the pulse for the pence-farthings section of the multiplicand register. The multiplier register receives its halving pulse three time units earlier than the doubling pulse for the pence-farthings section of the multiplicand register and accordingly the pulse to the transfer storage valves SS1, SS2, Fig. 11I, is conveniently applied through the lead 136 which conveys the multiplier halving pulses, said lead 136 being connected to the grids of valves SS1, SS2 through condenser 218a and resistances 219a.

The doubling pulse is applied to the pence-farthings section through the pair of contacts 210a, 211a, lead 213a and the common pulse input lead 222a which is connected through condensers 223a to the grids of all the pence and farthings attendant valves DQ0A, DQ1A . . . F0A, F2A.

Simultaneously with the application of the doubling pulse to the pence-farthings section a pulse is applied to the units to tens of shillings transfer storage pair of valves ST1, ST2 through lead 213a, Figs. 11I and 11J, and a further lead 217b, Fig. 11H, condenser 218b and resistances 219b.

The application of the doubling pulse to the units of shillings section is effected by contacts 210b, 211b through lead 213b and common input lead 222b, which is connected through condensers 223b to the grids of all the units of shillings attendant valves SQ0A1, SQ0A2 . . . SB0A, SB1A.

Simultaneously, with the application of the doubling pulse to the units of shillings section a pulse is applied to the units of pounds to tens of pounds transfer storage pair of valves PS1, PS2 through lead 213b and a further lead 217c and resistances 219c.

The doubling pulse is applied to the tens of shillings units of pounds section by contacts 210c, 211c, lead 213c, common in-put lead 222c and condensers 223c and at the same time a pulse is applied to the tens of pounds-hundreds of pounds transfer storage pair of valves (not shown).

In each higher pounds denomination the doubling pulse is applied by a corresponding pair of contacts, 210d, 211d, 210e, 211e . . . and so on, and leads 213d, 213e and so on; and simultaneously with the application of the doubling pulse to any pounds denomination, a pulse is applied to the transfer storage pair of valves controlling the transfer into the next higher denomination but one.

The doubling pulses are emitted by the same drum 142 (Fig. 11C) as that which controls the halving pulses. The first doubling pulse occurs two time intervals after the first halving pulse and the timing of the successive halving operations and the successive doubling operations is described later.

As already mentioned, each time the multiplier is odd, the multiplicand is entered into the product register and in order to control these entries the following apparatus is provided which is controlled by the number 1 valve UB1 in the units binary sub-denomination of the multiplier register.

As already explained, the multiplicand is not doubled simultaneously but is doubled in sections and the doubling of the highest denominational section of the multiplicand occurs up to twenty time units after the halving of the corresponding multiplier, depending on the value of said highest section.

Since, in the event of this multiplier being odd, the individual results obtained by doubling each section of the multiplicand have to be entered consecutively into the product register, a record of the condition of any given multiplier, that is whether it is odd or even, has to be retained in the machine until the doubling of the whole of the corresponding multiplicand has been completed.

Further, the actual entering of the multiplicand into the product register requires a certain number of time intervals and the record of the condition of the multiplier has to be retained during these further time intervals also.

Accordingly, in the present machine, four separate devices are provided for retaining a record of the condition of the multiplier so that, for example, there can be retained in the machine the condition of the original multiplier, of half the multiplier, of a quarter and an eighth, these records being retained pending completion of the doubling of the corresponding multiplicands and the entry of these multiplicands into the product register.

Each of the four devices which retain a record of the odd or even condition of the multiplier comprises an Eccles-Jordan trigger pair of valves indicated at 1E1, 1E2, 2E1, 2E2, 3E1, 3E2, and 4E1, 4E2, Fig. 11F, respectively.

The anode of the No. "1" valve UB1 in the multiplier units binary ring is connected through lead 249, Figs. 11E and 11F, and a potential divider comprising resistances 250, 251 to the negative line NL and the intermediate point 252 of this potential divider is connected through brush 254 and contact 255 on rotating drum 256 to the grid of each valve 1E1, 2E1, 3E1, 4E1, in turn by means of the brushes EB1, EB2, EB3 and EB4 respectively.

The drum 256 is secured to the shaft 31 and the timing of contact 255 with relation to the timing of the halving pulses controlled by the drum 142 is such that contact 255 engages one of the brushes EB1, EB2 . . . one time unit after each halving pulse.

Assuming that a halving pulse has converted the multiplier into the odd condition, then the valve UB1 will be registering, that is to say, this valve will be in the non-conducting state, and its anode will be at a high potential.

One time unit after the halving pulse has occurred, the contact 255 engages one of the brushes, for example, EB1, whereby the grid potential of the valve 1E1 of the corresponding pair will be made positive, if it was previously negative, or will remain positive if it was previously positive.

Accordingly valve 1E1 becomes, or remains, conducting if the multiplier is odd and therefore valve 1E2 becomes or remains non-conducting, that is to say, its anode is at a high potential.

If the above mentioned halving pulse had converted the multiplier to the even condition, the valve UB1 would have become conducting, that is to say, its anode would be at low positive potential so that the grid potential of valve 1E1 would be correspondingly low and valve 1E1 would become non-conducting resulting in that valve 1E2 becomes conducting, that is to say, its anode has a low potential.

The anode of the valve 1E2 is connected to a lead F1, and by apparatus hereinafter described, to the grid of a valve forming part of the product entry control apparatus.

One valve of each of the other record retaining pairs of valves, namely the valve 2E2, 3E2, 4E2 is likewise connected to a signal transmission lead F2, F3, F4 respectively by which the signals indicating an odd or even multiplier are transmitted to the product entry control apparatus.

The anode of each valve 1E1, 2E1 . . . is connected to the positive line PL through a resistance 263 and the grids of each of these valves is connected to the negative line NL through a resistance 264. Also the anodes of each of the valves 1E2, 2E2, 3E2 and 4E2 are connected to the normally positive line KK1, through resistances 263a and the grids of these valves are connected to the negative line NL through resistances 264a. In addition the grid of each valve of each pair is connected through a resistance 265 to the anode of the other valve of the same pair.

It is here convenient to explain in general terms the manner in which the entry of the multiplicand into the product register is effected when the multiplier is odd and prevented when the multiplier is even.

In the product register there is a ring of valves for each sub-denomination of the product, these valves being indicated by the same references as the corresponding valves in the multiplicand register prefixed by the letter P.

The cathodes of all the valves are at zero potential. Each anode is connected through a resistance 270, Fig. 11M, to the positive supply line PL and the grid of each valve is connected by resistance 271 to the anodes of all the other valves in the same ring and through a resistance 272 to the negative point 273 of the ring.

Thus far, in each ring the valves are connected in the same manner as for the corresponding ring in the multiplicand register but in addition in the product register the anode of each valve is coupled through resistance 275 and condenser 276 to the grid of the next higher value valve and the anode of the highest value valve is coupled through resistance 275a, lead 277 and condenser 276a to the grid of the lowest value valve in the same ring.

Thus, for example, in the farthings ring, Fig. 11P, the No. "0" valve PF0 has its anode condenser coupled to the grid of the number 1 valve PF1, the anode of PF1 is condenser coupled to the grid of PF2, the anode of PF2 is condenser coupled to the grid of the valve PF3, which represents three farthings, and the anode of PF3 is condenser coupled to the grid of the number "0" valve PF0.

Thus, if three farthings is already registered and one farthing is added, the valve PF3 will cease to register and the valve "0" will register no farthings. At the same time one digit must be carried or transferred to the pence quaternary denomination and to this end the anode of the highest value valve PF3 is coupled through lead 278, resistance 279 and condenser 280 to the grid of one valve of an Eccles-Jordan trigger pair of transfer control valves, which in the diagram are indicated by the generic reference TC, the pair for controlling the transfer to the pence quaternary denomination being indicated at TC1 and TC2, Fig. 11P.

These connections are similarly repeated in each denomination ring, the transfer control valve for controlling the transfer from the pence quaternary to the pence ternary sub-denomination being indicated at TC3 and TC4 and that for the transfer from pence ternary to units of shillings at TC5 and TC6 and so on.

The entry of a digit into any denomination of the product register is controlled as follows:

For each sub-denomination there is provided a pair of entry control valves, indicated by the generic reference EC, Fig. 11L, the entry control valves for the farthings denomination being indicated at EC1, EC2, those for the pence quaternary sub-denomination at EC3, EC4 for the pence ternary sub-denomination at EC5, EC6 and so on.

Associated with each pair of EC valves is an auxiliary valve, given the generic reference ECA, which when it is non-conducting, will have no effect either way on its associated EC pair, when, however, the ECA valve is conducting it will make the EC pair assume the active condition. The anode of each of the ECA valves is connected through a resistance 281a to the grid of its associated even numbered EC valve.

In each pair of valves EC, the valve indicated by the even suffix numeral has its anode connected through a resistance 281, Fig. 11L, through a lead 284 to one brush ER1, ER3, ER5 ... of a corresponding denominational pair of entry control brushes ER1, ER2, ER3, ER4, ER5, ER6; and so on, Figs. 11K and 11L.

These entry control brushes engage a drum 285, Figs. 5 and 9, secured to shaft 31 and provided with segments 286, which connect the brushes of each pair at 1/600 second intervals, Fig. 11L.

The other brush ER2, ER4, ER6 ... of each pair is connected through lead 287, Figs. 11K to 11P, and condenser 288 to the negative lead 273 of the corresponding denominational ring of valves in the product register. Lead 287 is also connected through resistance 289 to a line 289a which is at plus 50 volts, this being approximately the voltage of the even numbered EC valve when this is inactive.

If one of the EC valves having an even suffix numeral, for example, the valve EC4 of the pence quaternary entry control pair is conducting and its anode is therefore at a low potential each time a segment 286 on drum 285 connects the brushes ER3, ER4 of the corresponding pair, the even numbered brush ER4 of the pair remains at approximately the same potential so that no change occurs in the condition of the corresponding denominational ring in the product register.

If, however, the valve EC4 becomes non-conducting its anode will be at a high potential. Consequently, each time the corresponding pair of brushes ER3, ER4 is connected by a segment 286 a positive pulse is applied to the negative lead of the corresponding ring in the product register.

As long as the valve EC4 remains non-conducting positive pulses will continue to be applied at unit time intervals to the negative lead of the corresponding valve ring in the product register.

Assuming, for example, that the pence quaternary product ring is registering zero, then the No. "0" valve PDQ0 will be non-conducting, its grid being negative, and the other three valves in the ring will be conducting, their grids being positive.

Then if a positive pulse is applied to the negative lead 273 of the ring, it will raise the potentials of all the grids, making the negative grid positive and raising the other grids to a higher positive potential than before.

Since the grid of the previously non-conducting valve PDQ0 is condenser-coupled to the anode of the next higher value valve PDQ1, the sharp drop in the anode potential of PDQ0 due to its grid becoming positive, makes the grid of PDQ1 negative so that this valve becomes non-conducting and the ring accordingly registers "1" instead of "0."

The time constants of the condenser circuits and of the positive pulse applying circuits are such that the positive pulse ends before the condenser is discharged. When the positive pulse ends the grids of all the valves fall in potential, so that the grid potential of PDQ1, already made negative as explained above, becomes more negative still, while the grids of the other valves including PDQ0 remain positive.

Accordingly, the application of a positive pulse to the negative lead of the ring causes the non-conducting valve PDQ0 to become conducting and the next higher valve PDQ1 to become nonconducting whereby the ring is caused to register "1."

Similarly the application of a second positive pulse to the negative lead of the ring will cause the non-conducting valve PDQ1 to become conducting and the next higher value valve PDQ2 to become non-conducting, whereby the ring is caused to register "2."

A third positive pulse will cause PDQ2 to become conducting and PDQ3 to become non-conducting whereby the ring registers "3."

If now a fourth pulse is applied to the negative lead of the ring, the sharp drop in the anode potential of PDQ3, being communicated through resistance 275a, and condenser 276a to the grid of the No. "0" valve PDQ0 makes this valve non-conducting so that zero is registered in the ring.

At the same time the drop in anode potential of PDQ3 is communicated through lead 278, resistance 279 and condenser 280 to the grid of the valve TC4 of the transfer control pair TC3, TC4, which control the transfer from the pence quaternary ring to the pence ternary ring.

The valves TC3, TC4 are Eccles-Jordan connected, the anode of TC4 being connected to the line KK1 so that the pair is inactive during sensing, and the grid of TC4 is coupled through resistance 290, and lead 213a (Figs. 11N and 11P) to the contact 211A co-operating with the segment 141 on the drum 142 whereby after each entry of a digit into the pence quaternary ring a positive pulse is applied to the grid of valve TC4 making it conducting, if it was previously non-conducting, or allowing it to remain conducting if it was previously conducting.

Accordingly, at the time when the positive pulse is applied to the grid of PDQ3 as described above and the consequent drop in anode potential of PDQ3 is communicated to the grid of valve TC4, the valve TC3 is non-conducting and TC4 is conducting. The aforesaid drop in anode potential of PDQ3 therefore lowers the grid potential of TC4 and makes this valve non-conducting whereupon TC3 becomes conducting. Hence the anode of TC4 is at a high positive potential.

The anode of TC4 is connected through a resistance 294a and lead 295 to a transfer entry contact T, Fig. 11L, in a group of product entry contacts PE3 through which the pence ternary digit of the multiplicand is entered into the product register, whereby a high positive potential is applied to said contact PE3T.

A second resistance 294 connects lead 295 to the line NL, the resistances 294 and 294a forming a potential divider.

As will be explained later, when the contact T is highly positive one extra digit is entered into the pence ternary ring of the product register.

Referring now again to the product entry control valve pairs EC, Fig. 11L, the connections of the even numbered valves, such as EC4 have already been described. Each ECA valve has its grid connected through a resistance 300 to a contact or contacts of a series given the generic reference PR, there being contacts PR1, PR2, PR3, . . . and so on to each sub-denominational ring of the product register.

These contacts PR are arranged in rings 302 and brushes 304 on shaft 77, Figs. 3, 6, 9 and 11L, connect each contact PR with another contact PE. The brushes pass the contacts at intervals of six time units, which equals 1/100 second, and the contacts are spaced so that the brushes pass consecutive contacts at intervals of one time unit, which equals 1/600 second, or multiples of this interval.

Opposite each PR contact is a corresponding contact PE, the PE contacts being arranged in groups, each group of contacts PE1, PE2 . . . comprising a resetting contact R, hereinafter referred to, a transfer entry contact T, which as described above is coupled to the anode of the valve such as TC4 of the transfer control pair controlling the transfer from the sub-denomination below that to which the group of PE contacts pertains, and also one contact for each digit in the sub-denomination to which said group pertains, except the digit "0."

In the farthings group PE1 there are a resetting contact PE1R, which for reasons hereinafter explained occupies the transfer contact position, there being no transfer contact because there can be no transfer to farthings, and three digital contacts "1," "2" and "3."

The pence quaternary group PE2 has a contact PE2R a transfer entry contact PE2T and three digital contacts PE21, PE22 and PE23.

In the higher su-denominational groups the PE contacts are similarly arranged, for example, in the units of shillings binary group PE4, Fig. 11K, there is a contact PE4R, a contact PE4T and one digital contact PE41, while in the units of shillings quinary group PE5 there is contact PE5R, a contact PE5T and four digital contacts PE51, PE52, PE53, PE54.

Within each group, the contacts are disposed at one time unit apart, and the PER contact in each group is disposed at seven time units from the PER contact in the next group, being disposed opposite the corresponding PER contact.

In order to facilitate understanding of the operation of entry of the multiplicand into the product register, a contact is shown for each time unit, but the ineffective contacts are shown unconnected.

In each group the PER contact is connected to the negative line, and in the farthings group the contact PER1 is also connected to the negative line, while each digital contact is connected through a lead 305 to the anode of the corresponding digital valve in the corresponding sub-denominational ring of the multiplicand register, and the PET contact is connected through lead 295 and potential divider 294, 294a to the anode of the even numbered valve of the transfer control pair TC controlling the transfer from the next lower sub-denomination.

Thus, considering the group of contacts PE5, for the units of shillings quinary denomination the digital contacts PE51, PE52, PE53 and PE54 are connected respectively through leads 305 to the anodes of the Nos. "1," "2," "3" and "4" valves SQ1, SQ2, SQ3 and SQ4 in the multiplicand register, Fig. 11H. The PET contact is connected through lead 295 and resistance 294 to the negative line NL and through resistance 294a, Fig. 11N, to the anode of the valve TC8 of the pair controlling the transfer from the units of shillings binary sub-denomination in the product register to the units of shillings quinary sub-denomination thereof. The contact PER is connected to the negative line NL.

Also the corresponding contacts PR51, PR52, PR53 and PR54 are connected together and through resistance 300a to the grid of the ECA5 valve as above described. The contacts PR5R, PR5T opposite PE5R and PE5T are connected together and through a resistance to the grid of the valve EC9 of the corresponding control pair.

As already explained, if the multiplier is odd, a positive signal is sent out by one or other of the leads F1, and by means described later this positive signal is applied through respective wires OM1, OM2, OM3, Figs. 11F and 11L, and so on, and respective resistances 310a to the point 311a at which the lead 312a connecting the respective PR contact through resistance 300a to the grid of the respective ECA valve is connected to the resistance 300, this point 311a being the mid point of a potential divider constituted by the resistances 300, 310a.

Thus, in the case of the units of shillings quinary denomination the positive signal from one of the leads F1, F2 ... is applied through lead OM5 to the resistance 310a of the particular potential divider 300, 310a of which the resistance 300 is connected to the contact PR5 and whose mid point 311a is connected through lead 312a to the grid of the units of shillings quinary auxiliary entry control valve ECA5, Fig. 11K. This positive potential remains applied to resistance 310a for four time units.

Assuming that the multiplier is odd and that, as stated above, the multiplicand units of shillings quinary sub-denomination is registering "3" (–6/–) then the No. "3" digital contact PE53 in the group PE5 will be positive and if there is to be no transfer from the units of shillings binary to the units of shillings quinary sub-denomination in the product register the transfer entry contact PET in group PE5 will be at low positive potential, because it is connected through lead 295 to the anode of valve TC8, which is conducting because there is no transfer.

The digital contacts PE51, PE52 and PE54 in the group PE5 are at a low positive potential as they are connected through their respective leads 305 to the anodes of the corresponding digital valves SQ1, SQ2, SQ3, SQ4 in the units of shillings quinary sub-denomination of the multiplicand register, and these three valves are not registering, that is, they are in the conducting state so that their anodes are at a low positive potential.

Immediately after the positive potential has been applied to the point 311a through OM5 from one or other of the valve pairs IE1, IE2, and so on, which retain a record of the odd or even condition of the multiplier, a brush 304 mounted on the shaft 77, Fig. 9, engages the contact PR54 and the contact PE54 in the group PE5.

This contact PE54 is at low positive potential because the multiplicand register valve SQ4 to the anode of which it is connected is not registering and is therefore conducting. This low positive potential of the contact PE54 is passed through the brush 304 contact PR54, resistance 300a, point 311a, lead 312a to the grid of valve ECA5, which is also connected to OM5 and NL. As a result ECA5 does not conduct and accordingly the anode potential of valve ECA5 remains high, so that the valve EC10 remains conducting, that is, the entry control pair EC9, EC10 remains inactive.

While the brush 304 is in engagement with the contact PE54 a segment 286 on drum 285 connects the brushes ER9, ER10 whereby the negative potential of lead 284 is communicated through lead 287 and condenser 288 to the negative lead of the units of shillings quinary ring in the product register, Fig. 11N. Since this lead is already negative no change occurs in the condition of the valves in this ring of the product register and hence the valve PSQ0 remains non-conducting, so that zero is still registered in the units of shillings quinary ring of the product register.

One time unit later the brush engages the contact PE53. This contact is at a high positive potential because the multiplicand valve SQ3 is non-conducting, and this high potential is applied through the brush 304, to contact PR53 and resistance 300a to the point 311a, and, with the existing positive potential applied through OM5 to the point 311a, gives a resulting positive potential which, applied through lead 312a to the grid of valve ECA5 makes this grid positive, whereby the valve ECA5 becomes conducting and its anode potential consequently drops. Hence the grid potential of valve EC10 drops also and becomes negative, whereby valve EC10 becomes non-conducting and its anode potential rises. This causes valve ECA9 to become conducting.

As soon as the brush 304 leaves the contact PR53 the grid of the valve ECA5 becomes non-conducting thus removing the positive bias applied to the grid of valve EC9. However, EC9 and EC10 are wired as a trigger circuit and so remain in the active state.

This rise in the anode potential of EC10 is sufficient to overcome the negative potential of lead 284 with the result that brush ER9 becomes positive.

Hence as long as valve EC10 remains non-conducting, each time the brushes ER9, ER10 are connected by a segment 286 on drum 285, a positive pulse is applied through lead 287 to the negative lead of the units of shillings quinary product ring.

The digit which is added into this product ring, depends upon the number of consecutive positive pulses which are applied to the negative lead of the ring. That is to say, on the number of time units during which the brush ER9 remains positive, which in turn depends upon the number of time units during which the valve EC10 remains non-conducting.

Valve EC10 remains nonconducting until a negative pulse is applied to the grid of valve EC9 and the manner in which such a pulse is applied will now be described.

One time unit after the No. "3" contact in group PE5 has engaged brush 304 and, in the manner described above, by making valve EC10 non-conducting has started the application of positive pulses to the negative lead of the corresponding product ring, the No. "2" contact of the same group is engaged by brush 304.

Since this contact is connected to the anode of multiplicand register valve SQ2 which is conducting, contact No. "2" is at a low positive potential and does not affect the condition of valve EC10.

Two time units after valve EC10 became non-conducting the brush 304 engages the No. "1" contact, and as this is at low positive potential, again no change occurs in the condition of valve EC10.

One time unit later the brush 304 connects the contact PE5T through lead 312 and potential divider 310, 310b whose mid-point is indicated at 311 in the trigger circuit EC9, EC10 to the grid of valve EC9 thus producing a bias sufficiently strong to overcome the trigger locking bias of the transfer control pair EC9, EC10, so that the valve EC9 is completely under the control of the transfer control pair TC7, TC8.

Thus if there is to be a transfer the valve EC9 becomes (or as in this case) remains conducting thereby causing one or more pulses to be given to the shillings quinary ring.

If there is not to be a transfer the valve EC9 becomes or remains non-conducting so that no more pulses are added.

One time unit after the brush 304 has engaged the transfer contact PE5T, the brush engages the reset contact PE5R, which being directly connected to the negative lead, passes a negative pulse to the grid of valve EC9 which, however, being already non-conducting does not change its condition.

A positive pulse, which is a transfer clearing pulse is now applied through lead 213b to the grid of TC8 causing it to become conducting thus setting it inactive. In the lower denominations these pulses are simultaneous with the doubling and halving pulses.

The transfer clearing pulses are not independent pulses but are included in the doubling pulses as follows:

| Transfer clearing pulse to— | Transfer clearing pulse included in— |
|---|---|
| Farthings to Pence quaternary. Pence quaternary to Pence ternary. | Pence and Farthings doubling pulse. |
| Pence ternary to Shillings binary. Shillings binary to Shillings quinary. | Shillings doubling pulse. |
| Shillings quinary to tens of shillings. | Hundreds of pounds doubling pulse. |
| Tens of Shillings to Pounds binary. Pounds binary to Pounds quinary. | Units of pounds doubling pulse. |

The transfer clearing pulse in all higher denominations is transmitted by the brushes 138 and contacts to leads TCL1, TCL2, . . . Figs. 11C and 11M.

From the foregoing it will be seen that a given digit is entered into any denominational ring of the product register by applying to the negative lead of the ring consecutive positive pulses equal in number to the value of the digit to be entered, and that the pulses are initiated by engagement of the brush 304 with the same value digital contact in the corresponding denominational PE contact group, the pulses being caused to cease when there is no transfer from the next lower denominational product ring, by the transfer control pair of valves from the next lower sub-denomination.

The positive potentials are applied to the points 311 through the lines OM1, OM2, OM3 and so on by the following means.

Secured to the shaft 31 are four slip rings SR1, SR2, SR3, SR4, Fig. 11F, one for each of the valve pairs 1E1, 1E2, 2E1, 2E2, and so on which retain a record of the odd or even condition of the multiplier, each of said slip-rings being connected by a corresponding brush SB1, SB2, SB3, SB4, to the respective output lead F1, F2, F3, F4 of the corresponding even pair.

Also secured to the shaft 31 is a distributor 330, provided with four equally spaced segments S1, S2, S3, S4. The shaft rotates at a speed such that each segment will remain in contact for four time units with a brush engaging the periphery of the drum, the space between adjacent segments being equal to two time units.

The segment S1, is connected to the slip ring SR1, Segment S2 is likewise connected to the slip ring SR2. Similarly segment S3 is connected to slip ring SR3 while Segment S4 is connected to slip ring SR4.

Co-operating with distributor 330 is a series of product entry control brushes PB1, PB2, and so on, these brushes being disposed at one time unit apart and there being one brush for each sub-denomination in the product register, the brush PB1 controlling the farthings entry, the brush PB2 cntrolling the pence quaternary entry, the brush PB3 controlling the pence ternary entry and so on. Each PB brush is connected to a corresponding one of the OM leads, which as already mentioned are respectively connected to the points 311 already referred to.

The original valve set up in the multiplier register by successive halvings is eventually reduced to zero, and after the corresponding multiplicand has been entered into the product register, assuming the last multiplier to have been odd, it is desired to zeroise the multiplicand register.

This zeroising of the multiplicand register is effected by applying a pulse to the No. "0" valve in each denominational ring of multiplicand register valves, these pulses being applied from a contact drum 350, Fig. 11C, through a common lead 351.

The final product is the sum of the multiplicands successively entered into the product register and it is desired to read this product out of the product register and punch it into the card from which the factors were read. Further, in punching the product, the amount thereof which is held in the product register in the binary-quinary notation has to be converted into the sterling notation.

To this end mechanism hereinafter described is employed.

After the product has been read out from the product register this register is zeroised by applying a pulse to the No. "0" valve in each denominational ring of the product register valves, these pulses being applied from the contact drum 350 through a common lead 460, Figs. 11C, M, N, P.

*Reading out and punching mechanism*

Referring to Figs. 1A, 1B, 7 and 11Q, the punching mechanism is of known construction which includes a plurality of columns of punches to be selected for operation by corresponding set-bars settable from the product register. The card from which the factors were read is fed between punch die plates 334, 335 against the stop 39, Fig. 7, and, after the set-bars have been set they are lowered onto the punches, whereby the punches which have been selected are forced through the card.

As already explained each decimal denomination of the product register is divided into two sub-denominations, of which one is binary while the other is quinary, while the pence denomination is divided into two sub-denominations of which one is quaternary while the other is ternary.

Since it is desired to punch the product in the card in the normal sterling notation, it is necessary to convert the digits of the binary-quinary, and quaternary-ternary notations with which the product register is constructed to deal, into the sterling notation when selecting the punches for operation, and the mechanism for effecting this conversion will now be explained in respect of the pence denomination by way of example, referring to Figs. 1A, 1B, 7, 11P and 11Q.

The punches are shown diagrammatically at 400, and the set-bars at 401. The set-bars 401 are set through connection wires 402 by means of a finger 403 pivoted at 404 to an arm 470, Fig. 1A, pivoted to the machine frame and swingable over the column of set-bars 401 by the mechanism described below and shown in Figs. 1B and 11Q under control of the pence-quaternary and pence-ternary valves PDQ and PDT in the product register.

Pivoted to the machine frame 336 at 405 (Fig. 11Q) is a lever 406 associated with the pence-ternary denomination and pivoted to the frame at 407 is a similar lever 408 associated with the pence-quaternary denomination.

Pivoted to lever 406 at 409 is a link 410 which is pivoted to lever 408 by a pin and slot connection 411.

A link 412 pivoted to the finger 403 at 413 has its other end pivoted to link 410 at a point 414 which is distant from pivot 409 one fifth of the distance between points 409 and 411. Consequently link 412 will move four-fifths of the extent of movement of point 409 plus one-fifth of the extent of movement of point 411.

Lever 406 has five ratchet teeth 415 with which cooperate the long arm 416 of a bell-crank actuated by a magnet 417 and lever 408 has five ratchet teeth 418 with which co-operate the long arm 419 of another bell-crank actuated by a magnet 420.

The longer arms of levers 406 and 408 are side by side and are urged by springs 408a, Fig. 1B, towards the pins 421 carried by a restoring link 422 supported by links 423 pivoted to the frame 336 at 424 and an arm 425 pivoted to the frame at 426, Fig. 3. The arm 425 is operated by links 425a, 425b, follower arm 425c and cam 425d mounted on the cross shaft 30, and normally positions the arm 425 to hold the levers 406 and 408 in the fully restored position in which the finger 403 is clear of all the connection wires 402.

A similar arrangement of levers 406 and 408 is provided for each denomination as can be seen from Fig. 1B, and to accommodate all the required units some are disposed on one side of the frame 336 and some on the opposite side thereof.

The lever 406 carries a wiper 430 which co-operates with four contacts 431a, 431b, 431c, and 431d, and the lever 408 carries a wiper 432 which co-operates with four contacts 433a, 433b, 433c, and 433d.

In the pence unit, Fig. 11Q, the contacts 431a and 431b are left unconnected but the contact 431c is connected through wire 427 to the anode of the No. "0" valve PDT0 in the pence ternary denomination of the product register and the contact 431d is connected through wire 427 to the anode of the No. "1" valve PDT1 in the same denomination.

The contact 433a is unconnected while the contacts 433b, 433c and 433d are respectively connected through wires 427 to the valves PDQ0, PDQ1 and PDQ2 in the pence quaternary denomination of the product register.

The wiper 430 is connected through two resistances 440, 441 to a line KL at minus 30 volts and the intermediate point of the potential divider formed by said resistances is connected to the grid of a control valve 443 for the magnet 417 which is connected through leads 444 and 445 to the positive line PL.

After the product has been accumulated in the product register, the restoring link 422 is moved by cam 425d, arm 425c, links 425b, 425a, arm 425 and links 423, to the right as viewed in Fig. 11Q, thereby allowing the lever 406 to rock counterclockwise about its pivot 405 and lever 408 to rock clockwise, thus swinging the pence setting finger 403 from left to right along the pence column of connection wires 402.

Assuming that the pence product digit is 10d. then the No. 2 valve PDT2 in the pence ternary denomination of the product register (representing 8d.) and the No. 2 valve PDQ2 in the pence quaternary denomination (representing 2d.) will be non-conducting.

As lever 406 moves counterclockwise its wiper 430 moves over the contacts 431a to 431d but as none of these is connected to a product register valve which is non-conducting the engagement of wiper 430 with these contacts has no effect and lever 406 moves to its maximum extent representing 8d. when it is arrested by a longer and final ratchet tooth.

As lever 408 moves clockwise its wiper 432 moves over the contacts 433a to 433d. Of these, the contact 433d is connected through its wire 427 to the anode of the valve PDQ2 which is non-conducting. Accordingly when wiper 432 reaches contact 433d a pulse from valve PDQ2 is delivered through the associated wire 427, contact 433d, wiper 432 and resistance 440a to the mid point of the potential divider 440a, 441a, whereby the control valve 443a for magnet 420 is caused to conduct, whereby magnet 420 is energised through a circuit extending from positive line PL through leads 445 and 444a, magnet 420, cathode of valve 443a, to neutral point.

Energisation of magnet 420 rocks arm 419 into engagement with ratchet teeth 418 thereby arresting lever 408 in the position representing 2d.

As already explained link 412 moves four-fifths of the extent of movement of point 409 plus one-fifth of the movement of point 411. Further the point of connection 413 of link 412 and setting finger 403 is so positioned that finger 403 moves four pitches of the connection wires 402 during movement of wiper 432 from one contact 433 to the next.

Accordingly the combined movement of levers 406 and 408 effects the positioning of setting finger 403 over the 10d connection wire 402.

When the setting finger 403 has been positioned as above described, the arm 470 carrying the pivot 404 is turned about its pivot 471 by the link 472 which is actuated by the cam 473 on cross shaft 30 through arm 480 so that the finger 403 moves downwards and depresses the selected connection wire 402 of the column thus causing the selected set bar 401 to be locked in known manner ready for the punching operation.

The fingers 403 in the other denominations are positioned by similar mechanism and, when the fingers have been so positioned, and the selected set bars 401 locked, the die plates 334, 335 with the card disposed therebetween, are raised, in known manner, to the punches 400 by a cam 450 on the cross shaft 30, and arm 451.

The set bars are provided with the usual latch bars (not shown) which are released to clear the set bars at each operation by a bail 474 actuated from cam 471 (Figs. 1A and 7) through bell crank 475, link 476 and arm 477.

In the case of decimal denominations the lever 410 is divided in the ratio 1:2 in place of the 1:4 ratio of the pence denomination and the point 413 on the finger 403 is lower, so that the finger moves one unit for each digit of the binary sub-denomination and two units for each digit of the quinary sub-denomination.

In the case of farthings and tens of shillings one lever 408 operates the link 412 direct.

*Operation of machine*

The operation of the machine will now be briefly described with reference to an example in which it will be assumed that the sum of six shillings and ten pence three farthings is to be multiplied by fourteen.

The record card having the multiplicand and multiplier punched therein is fed from the magazine 20 and as it passes beneath the apertured plate 57 the images of the filaments of the lamps 50, 51 pass through the perforations in the multiplicand and multiplier fields of the card. The filament images are directed by the reflectors 70 on to the photo-electric cells 71 and thence through the amplifiers 72, 73 and contacts 90 on drum 91 to the distributors 80, 80a, 81, 81a and thence to the appropriate valves in the multiplicand, and multiplier registers so that the values 6/10¾ and 14 are registered respectively therein.

As the operation of the individual integers of the multiplying apparatus has been fully described above, it is thought that the manner in which the multiplier is successively halved, the multiplicand doubled and the value of the product entered into the product register can be most readily understood by setting out in tabular form the sequence in which the pulses are applied and the number of the time units at which each of the various functions occurs, starting from zero units after the multiplicand and multiplier values have been entered into their respective registers. Figures 13A, 13B and 13C show how the product value of 6/10¾ multiplied by 14 becomes entered into the product register and how at the end of the operation each of the registers has become zeroised.

From the foregoing description it will be remembered that the changes effected in the various registers overlap each other both in the respective registers and in the individual registers. Thus in the multiplicand and product registers there occurs at any one time a change in only a part thereof and in the table shown in Figures 13A, 13B and 13C at each stage there is illustrated in the columns appertaining to these registers only the changes effected at the given instant. This can be clearly seen from Figures 13A to 13C in which, for brevity, where an integer is inactive the reference to the particular integer is suffixed by the letter "I," where it is active it is suffixed by the letter "A" and where it is changed from one such state to the other, it is suffixed, for example, by the characters I/A. If the state of the integer remains unchanged it is suffixed, for example, by the characters I/I or if it is biased only, as occurs in some instances, the suffixing characters are prefaced by the letter (B).

During the interval in which the calculation is being effected on the multiplying apparatus, the card from which the factors were sensed is held in an arrested position by the card stop 37 but during the reading out operation it is released by this stop and is fed by the rolls 38 against the second stop 39 which positions the card between the die plates 334, 335 ready for the read-out product to be punched in the product field of the card.

The product value is read out from the product register in the manner described above and the magnets 417, 420 through arms 416, 419, levers 406, 408 and links 412 position the appropriate fingers 403 over the connecting wires 402. The selected set bars 401 are locked and thus when the card is lifted by the cam 471 against the punches 400, the selected punches perforate the value of the product in the product field of the card. The card is then delivered to the receiving magazine 49 and, the multiplicand and product registers having been zeroised as above described and as shown in Figure 13C, the machine is conditioned to be actuated by the next succeeding record-card fed from the magazine 20.

I claim:

1. A multiplying machine operating in accordance with the method according to which the product is obtained by successively halving the multiplier and doubling the multiplicand, and summing all the multiplicands corresponding to odd multipliers, comprising in combination on a multiplier and a multiplicand register each including a group of electronic tubes for each denomination, one tube to represent two digits in the denomination, the grid of each tube within each group being so coupled to the anodes of all the other tubes in the same group that when any one tube is in a predetermined (active) electrical state, all the other tubes in the group are in the opposite (inactive) electrical state, factor-entering apparatus, including means for applying to the grid of each tube corresponding to a digit to be entered an electrical pulse of a sign and magnitude such as to cause said tube to register the entered digit by assuming or maintaining the active state, means operative after completion of the factor entering operation and tending to apply successive pulses to the grids of all the tubes in each register, and selection means for each register, effective under the control of the tubes in said register, to permit the application of said pulses only to those tubes which, in the multiplier register, represent the digits of half the value already in said register, and, in the multiplicand register, represent the digits of double the value already in said multiplicand register, the machine further including a product register and means for reading off from the multiplicand register the value registered therein and entering said value into the product register, and means operative under control of the lowest value tube in the multiplier register to render said reading off means effective when said lowest value tube is in the active state.

2. A multiplying machine according to claim 1, wherein the selection means include one or more attendant electronic tubes to each of the registering tubes to which pulses are to be applied in the halving and doubling operations, the anodes of the particular registering tubes which, through the selection means are to control the application of the pulses to any particular registering tube, being coupled to the grid of an attendant tube for said particular registering tube, said attendant tube grid being coupled to a pulse input line and having its anode coupled to the grid of said particular registering tube whereby the potentials normally applied to the grids of the different tubes may be so selected that each attendant valve is normally in the inactive state and a change therein to the active state causes the registering valve to the grid of which the anode of said attendant valve is coupled to assume or maintain the active state, while the change in grid potential of an attendant tube due to the application of the pulse from the input line is insufficient to render said attendant valve active unless the appropriate register tubes whose anodes are coupled to the grid of said attendant valve are in the active state.

3. A multiplying machine according to claim 1, wherein the product register includes a group of electronic tubes for each denomination, one tube to represent two digits in the denomination, the grid of each tube within each group being so coupled to the anodes of all the other tubes in the same group that when any one tube is in the active state all the other tubes in the same group are in the inactive state, and the anode of each tube within each group being so coupled to the grid of the next higher digital value tube in the same group, that the application of an adding pulse of a predetermined sign and magnitude to the negative lead of all tubes in the group renders the active tube inactive and the next higher value tube active, the machine including also means operative under the control of the multiplicand register reading-off means for applying simultaneously to the grids of all the product register tubes in each denominational group respectively, a number of adding pulses equal in number to the digit registered in the corresponding denominational group of the multiplicand register, while the anode of the highest value tube in each denomination of the product register is coupled to the grid of the lowest value tube in the same denomination and also to a device arranged to be rendered effective, when said highest value tube changes to the inactive state, to apply an adding pulse to the grids of the product register tubes in the next higher denomination to effect a transfer of one unit.

4. A multiplying machine according to claim 1, where in order to increase the speed of operation of the machine, the multiplicand register is divided into denominational sections, and the doubling pulse applying means is constructed and timed to apply consecutive pulses of each of a number of consecutive series of pulses to groups of consecutive sections in ascending denominational order respectively, and to apply each pulse of one series to each group later than to the group of next lower value.

5. A multiplying machine operating in accordance with the method according to which the product is obtained by successively halving the multiplier and doubling the multiplicand, and summing all the multiplicands corresponding to odd multipliers, comprising in combination on a multiplier and a multiplicand register each including a group of electronic tubes for each denomination, one tube to represent two digits in the denomination, the grid of each tube within each group being so coupled to the anodes of all the other tubes in the same group that when any one tube is in a predetermined (active) electrical state, all the other tubes in the group are in the opposite (inactive) electrical state, factor-entering apparatus, including means for applying to the grid of each tube corresponding to a digit to be entered an electrical pulse of a sign and magnitude such as to cause said tube to register the entered digit by assuming or maintaining the active state, means operative after completion of the factor entering operation and tending to apply successive pulses to the grids of all the tubes in each register, and selection means for each register, effective under the control of the tubes in said register, to permit the application of said pulses only to those tubes which, in the multiplier register, represent the digits of half the value already in said register, and, in the multiplicand register, represent the digits of double the value already in said multiplicand register, the machine further including a product register and means for reading off from the multiplicand register the value registered therein and entering said value into the product register, and means operative under control of the lowest value tube in the multiplier register to render said reading off means effective when said lowest value tube is in the active state, said product register including a group of electronic tubes for each denomination, one tube for each binary and each quinary digit in the denomination, said product entry control means, in order that entry into the product register of an amount read off from the multiplicand register may be effected only when the contemporaneous multiplier is odd, including an odd/even control pair of electronic tubes forming a trigger pair, having the grid of the first tube of said pair coupled to the anode of the lowest value multiplier register tube, a trigger pair of product entry control tubes for each denomination, an auxiliary tube associated with each entry control pair, the anode of said auxiliary tube being connected to the grid of its associated even numbered entry control tube, said auxiliary tube when conducting being operative to cause its associated entry control pair to assume the active condition, a plurality of product entry contacts to each multiplicand denomination each spaced from a datum position by a distance representing its digital value, and each coupled to the anode of the corresponding value multiplicand register tube, a first connecting means to connect the contacts of each denominational group, in order of decreasing value, to the grid of the corresponding auxiliary entry control tube, a second connecting means for connecting the anode of the second tube of the odd/even trigger pair to the grid of each auxiliary entry control tube, said second connecting means being operative during the connection of said contacts to the grid of said auxiliary entry control tube, and a third intermittent connecting means operative synchronously with the other two to connect the anode of the even numbered tube of the entry control pair to the grids of the corresponding denominational group of product register tubes.

6. A multiplying machine according to claim 5, wherein, in order to effect a transfer from one product register denomination to the next, the anode of the highest valve tube in each product register denomination is connected to the grid of the first tube of a transfer control trigger pair of tubes in which the anode of said first tube is connected to a transfer contact in the next higher denominational group of product entry contacts, said transfer contact being disposed to be connected to the grid of the first product entry control tube after the associated auxiliary tube has been disconnected from the anode of the second tube of the odd/even pair, whereby the grid potentials may be selected so that when the highest value tube in a product denomination changes from active to inactive an adding pulse is passed to the grids of the tubes in the next higher product register denomination through the transfer contact and the product entry control tubes.

7. A multiplying machine operating in accordance with the method according to which the product is obtained by successively halving the multiplier and doubling the multiplicand, and summing all the multiplicands corresponding to odd multipliers, comprising in combination on a multiplier and a multiplicand register each including a group of electronic tubes for each denomination, one tube to represent two digits in the denomination, the grid of each tube within each group being so coupled to the anodes of all the other tubes in the same group that when any one tube is in a predetermined (active) electrical state, all the other tubes in the group are in the opposite (inactive) electrical state, factor-entering apparatus including means for applying to the grid of each tube corresponding to a digit to be entered an electrical pulse of a sign and magnitude such as to cause said tube to register the entered digit by assuming or maintaining the active state, means operative after completion of the factor entering operation and tending to apply successive pulses to the grids of all the tubes in each register, and selection means for each register, effective under the control of the tubes in said register, to permit the application of said pulses only to those tubes which, in the multiplier register, represent the digits of half the value already in said register, and, in the multiplicand register, represent the digits of double the value already in said multiplicand register, the machine further including a product register and means for reading off from the multiplicand register the value registered therein and entering said value into the product register, and means operative under control of the lowest value tube in the multiplier register to render said reading off means effective when said lowest value tube is in the active state, said multiplicand register, in order to increase the speed of operation of the machine, being divided into denominational sections, and the doubling pulse applying means is constructed and timed to apply consecutive pulses of each of a number of consecutive series of pulses to groups of consecutive sections in ascending denominational order respectively, and to apply each pulse of one series to each group later than to the group of next lower value, there being, in order to delay any transfer from a lower to a higher denominational section due to multiplication of an amount in the lower section by a given power of two until the amount in the higher section is multiplied by the same power of two, a trigger pair of transfer storage electronic tubes is provided between each section and the next, one of said tubes having its grid coupled to the anodes of the tubes in the lower denominational section representing digits which, when doubled cause a transfer, while the other transfer storage tube has its grid coupled to the anodes of the tubes in the lower denominational section representing digits which, when doubled do not cause a transfer, the anode of the "no transfer" tube being coupled to the grid of an attendant tube for the No. "1" tube in the next higher denominational section while the anode of the "transfer" tube is coupled to the grid of an attendant tube for the No. "0" tube in the next higher denominational section, each attendant tube having its anode coupled to the grid of the associated register tube, while the negative lead of the transfer storage tubes is coupled to a device for applying a pulse thereto simultaneously with the application of the doubling pulse to the next lower denominational section of the multiplicand register.

RICHARD EVEREST BALDWIN.

REFERENCES CITED

The following references are of record in the file of this patent:

UNITED STATES PATENTS

| Number | Name | Date |
|---|---|---|
| 2,213,565 | Lang | Sept. 3, 1940 |
| 2,261,542 | Dickinson et al. | Nov. 4, 1941 |
| 2,285,296 | Maul | June 2, 1942 |
| 2,346,616 | Saxby | Apr. 11, 1944 |
| 2,419,502 | Saxby | Apr. 22, 1947 |
| 2,425,131 | Snyder | Aug. 5, 1947 |
| 2,442,428 | Mumma | June 1, 1948 |